US012335459B2

(12) United States Patent
Jiang et al.

(10) Patent No.: US 12,335,459 B2
(45) Date of Patent: Jun. 17, 2025

(54) SYSTEMS AND METHODS FOR PREDICTING A CODING BLOCK

(71) Applicant: ZHEJIANG DAHUA TECHNOLOGY CO., LTD., Zhejiang (CN)

(72) Inventors: Dong Jiang, Hangzhou (CN); Jucai Lin, Hangzhou (CN); Jun Yin, Hangzhou (CN); Feiyang Zeng, Hangzhou (CN); Cheng Fang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 527 days.

(21) Appl. No.: 17/457,263

(22) Filed: Dec. 2, 2021

(65) Prior Publication Data

US 2022/0094910 A1 Mar. 24, 2022

Related U.S. Application Data

(63) Continuation of application No. PCT/CN2020/094118, filed on Jun. 3, 2020.

(30) Foreign Application Priority Data

Jun. 17, 2019 (CN) .......................... 201910523773.0
Jun. 25, 2019 (CN) .......................... 201910556647.5

(51) Int. Cl.
*H04N 19/105* (2014.01)
*H04N 19/119* (2014.01)
(Continued)

(52) U.S. Cl.
CPC ......... *H04N 19/105* (2014.11); *H04N 19/119* (2014.11); *H04N 19/147* (2014.11); *H04N 19/159* (2014.11); *H04N 19/176* (2014.11)

(58) Field of Classification Search
CPC .... H04N 19/105; H04N 19/11; H04N 19/119; H04N 19/147; H04N 19/159; H04N 19/176; H04N 19/593
See application file for complete search history.

(56) References Cited

U.S. PATENT DOCUMENTS 8,228,989 B2 7/2012 Kim et al.
10,284,844 B1 * 5/2019 Zhao ...................... H04N 19/11
(Continued)

FOREIGN PATENT DOCUMENTS

CN 101426140 A 5/2009
CN 101715135 A 5/2010
(Continued)

OTHER PUBLICATIONS

International Search Report in PCT/CN2020/094118 mailed on Aug. 26, 2020, 5 pages.
(Continued)

*Primary Examiner* — Jessica M Prince
(74) *Attorney, Agent, or Firm* — METIS IP LLC

(57) ABSTRACT

Systems and methods for predicting a coding block are provided. In some embodiments, the system may obtain the coding block in an image. The system may determine, based on the coding block, one or more searching templates corresponding to the coding block. For each of the one or more searching templates, the system may determine, based on the searching template, one or more candidate blocks from a reference region and determine a reference block corresponding to the searching template from the one or more candidate blocks. The reference region may include a plurality of reference pixels that are encoded. The system may determine, based at least in part on one or more reference blocks, a prediction block corresponding to the coding block.

19 Claims, 17 Drawing Sheets

(51) Int. Cl.
*H04N 19/147* (2014.01)
*H04N 19/159* (2014.01)
*H04N 19/176* (2014.01)

(56) References Cited

U.S. PATENT DOCUMENTS

| | | | |
|---|---|---|---|
| 10,284,860 B1 | 5/2019 | Zhao et al. | |
| 2009/0147855 A1* | 6/2009 | Song | H04N 19/103 375/E7.125 |
| 2009/0180538 A1* | 7/2009 | Visharam | H04N 19/176 375/240.15 |
| 2009/0232215 A1* | 9/2009 | Park | H04N 19/70 375/E7.125 |
| 2010/0195715 A1 | 8/2010 | Liu et al. | |
| 2011/0182357 A1 | 7/2011 | Kim et al. | |
| 2012/0044996 A1 | 2/2012 | Sato | |
| 2016/0277761 A1 | 9/2016 | Li et al. | |
| 2017/0070748 A1 | 3/2017 | Li et al. | |
| 2018/0098074 A1 | 4/2018 | Heo et al. | |
| 2019/0037217 A1* | 1/2019 | Jin | H04N 19/11 |
| 2019/0246113 A1* | 8/2019 | Xu | H04N 19/44 |
| 2020/0007880 A1 | 1/2020 | Zhao et al. | |
| 2020/0021850 A1 | 1/2020 | Niu et al. | |
| 2021/0037259 A1 | 2/2021 | Ko et al. | |
| 2021/0218959 A1 | 7/2021 | Jang et al. | |

FOREIGN PATENT DOCUMENTS

| | | |
|---|---|---|
| CN | 102427530 B | 10/2013 |
| CN | 104253997 A | 12/2014 |
| CN | 104702959 A | 6/2015 |
| CN | 105812798 A | 7/2016 |
| CN | 110166774 A | 8/2019 |
| CN | 110290388 A | 9/2019 |
| EP | 2081388 A1 | 7/2009 |
| EP | 3139607 A1 | 3/2017 |
| JP | 2015111774 A | 6/2015 |

OTHER PUBLICATIONS

Written Opinion in PCT/CN2020/094118 mailed on Aug. 26, 2020, 8 pages.
First Office Action in Chinese Application No. 201910556647.5 mailed on Oct. 19, 2020, 14 pages.
Telecommunication Standardization Sector of ITU, ITU-T H.264, 2013, 731 pages.
Telecommunication Standardization Sector of ITU, ITU-T H.265, 2015, 635 pages.
Kim, Dongcheol et al., Non-CE3: Determination of Wide-angle Mode Using the Size of a Coding Block, Joint Video Experts Team (JVET) of ITU-T SG16 WP3 and ISO/IEC JTC 1/SC 29/WG 11 14th Meeting: Geneva, 2019, 3 pages.
Yao, Chunlian et al., Intra Prediction Based on Interpolation, 2011 International Conference on Computer Science and Network Technology, 2011, 4 pages.
Zeng, Feiyang et al., Fast HEVC Intra Coding Algorithm for 4K Ultra-HD Video, Computer Knowledge and Technology, 2017, 4 pages.
Partial Supplementary European Search Report in European Application No. 20826709.6 mailed on Jul. 1, 2022, 14 pages.
Safa Cherigui et al., Hybrid Template and Block Matching Algoritim for Image Intra Prediction, IEEE International Conference On Acoustics, 2012, 4 pages.
T. Guionnet et al., Intra Prediction Based on Weighted Template Matching Predictors (WTM), Joint Collaborative Team on Video Coding (JCT-VC) of ITU-T SG16 WP3 and ISO/IEC JTC1/SC29/WG11, 2011, 8 pages.
Benjamin Bross et al., Versatile Video Coding (Draft 5), Joint Video Experts Team (JVET) of ITU-T SG16 WP3 and ISO/IEC JTC1/SC29/WG11, 2019, 396 pages.

* cited by examiner

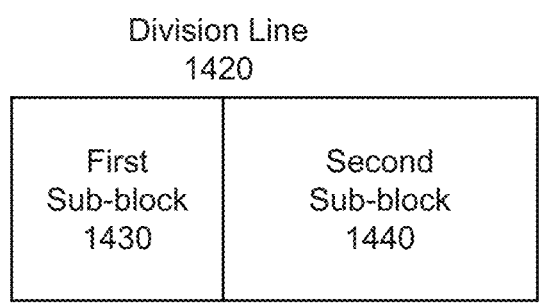
Coding Block 1401 with
Width greater than Height
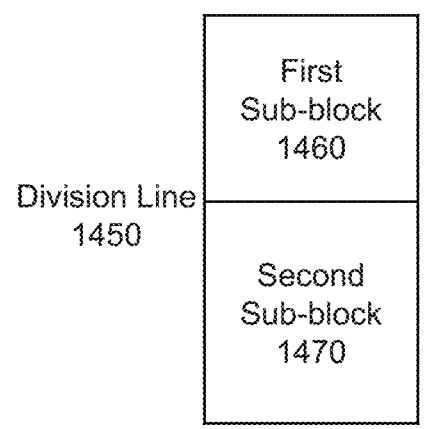
Coding Block 1402 with
Width less than Height
FIG. 14A
FIG. 14B

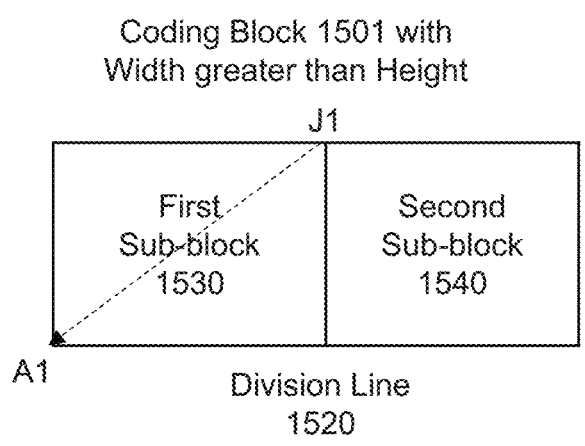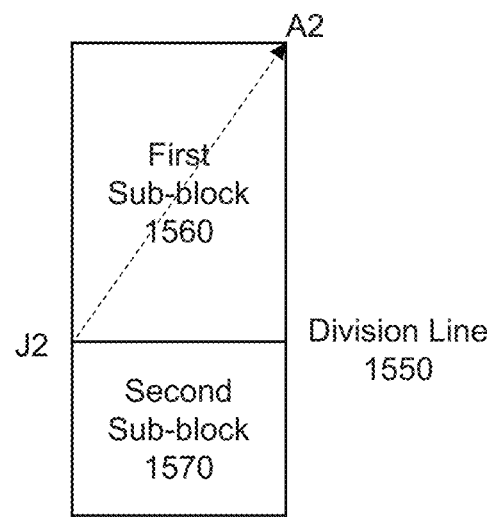
FIG. 15A
FIG. 15B

SYSTEMS AND METHODS FOR PREDICTING A CODING BLOCK

CROSS-REFERENCE TO RELATED APPLICATIONS

This application is a continuation of PCT Application No. PCT/CN2020/094118, filed on Jun. 3, 2020, which claims priority of Chinese Patent Application No. 201910523773.0, filed on Jun. 17, 2019, and Chinese Patent Application No. 201910556647.5, filed on Jun. 25, 2019, the contents of each of which are incorporated herein by reference.

TECHNICAL FIELD

The present disclosure generally relates to video encoding and decoding technology, and in particular, to systems and methods for predicting a coding block.

BACKGROUND

Image coding and decoding techniques are widely used in image data (e.g., videos, images) interaction (e.g., transmission or storage), which may reduce the data volume of the image data, thereby reducing network bandwidth and storage space during transmission. A coding process may include data acquisition, prediction, transformation, quantization, entropy coding, etc. The prediction may remove spatial redundancy and/or temporal redundancy of image data, thereby reducing the data volume of image data. Therefore, it is desirable to provide systems and methods for prediction with improved efficiency and accuracy, thereby effectively reducing the spatial redundancy and improving the compression rate of encoding.

SUMMARY

According to one aspect of the present disclosure, a system may be provided. The system may include at least one storage medium including a set of instructions and at least one processor to communicate with the at least one storage medium. When executing the set of instructions, the at least one processor may obtain a coding block in an image. The at least one processor may determine, based on the coding block, one or more searching templates corresponding to the coding block. For each of the one or more searching templates, the at least one processor may determine, based on the searching template, one or more candidate blocks from a reference region and determine a reference block corresponding to the searching template from the one or more candidate blocks. The reference region may include a plurality of reference pixels that are encoded. The at least one processor may determine, based at least in part on one or more reference blocks, a prediction block corresponding to the coding block.

In some embodiments, one of the one or more searching templates may include at least one of the coding block or a block in the image that may include at least a portion of the plurality of reference pixels.

In some embodiments, the at least a portion of the plurality of reference pixels may include reference pixels distributed along at least one of two adjacent sides of the coding block.

In some embodiments, a size of each of the one or more candidate blocks may be the same as a size of the searching template.

In some embodiments, to determine a reference block corresponding to the searching template from the one or more candidate blocks, the at least one processor may determine one or more matching degrees each of which may be between the searching template and one of the one or more candidate blocks. The at least one processor may also determine, based on the one or more matching degrees, the reference block from the one or more candidate blocks.

In some embodiments, each of the one or more matching degrees may be reflected by one of a value of a sum of absolute differences between pixels values in the searching template and pixel values in each of the one or more candidate blocks, a value of a mean squared error between pixels values in the searching template and pixel values in each of the one or more candidate blocks, a value of a mean absolute deviation between pixels values in the searching template and pixel values in each of the one or more candidate blocks, or a value of a count of threshold differences between pixels values in the searching template and pixel values in each of the one or more candidate blocks.

In some embodiments, to determine, based at least in part on one or more reference blocks, a prediction block corresponding to the coding block, the at least one processor may determine one or more first candidate prediction blocks corresponding to the coding block using one or more prediction modes. The at least one processor may also determine, based on the one or more reference blocks, one or more second candidate prediction blocks corresponding to the coding block. The at least one processor may also determine the prediction block corresponding to the coding block based on the one or more first prediction blocks and the one or more second prediction blocks.

In some embodiments, to determine the prediction block corresponding to the coding block based on the one or more first candidate prediction blocks and the one or more second candidate prediction blocks, the at least one processor may determine one or more first rate-distortion costs each of which corresponds to one of the one or more first candidate prediction blocks. The at least one processor may also determine one or more second rate-distortion costs each of which corresponds to one of the one or more second candidate prediction blocks. The at least one processor may also determine the prediction block corresponding to the coding block based on the one or more first rate-distortion costs and the one or more second rate-distortion costs.

In some embodiments, to determine the prediction block corresponding to the coding block based on the one or more first rate-distortion costs and the one or more second rate-distortion costs, the at least one processor may designate a specific second candidate prediction block among the one or more second candidate prediction blocks as the prediction block corresponding to the coding block in response to a determination that a second rate-distortion cost corresponding to the specific second candidate prediction block may be minimum among the one or more second rate-distortion costs and the one or more first rate-distortion costs. Alternatively, the at least one processor may designate a specific first candidate prediction block among the one or more first candidate prediction blocks as the prediction block corresponding to the coding block in response to a determination that a first rate-distortion cost corresponding to the specific first candidate prediction block may be minimum among the one or more first rate-distortion costs and the one or more second rate-distortion costs.

In some embodiments, the one or more prediction modes may include at least one of a planar prediction mode, a DC prediction mode, or one or more angular prediction modes.

In some embodiments, the one or more angular prediction modes may include at least one of one or more conventional angular prediction modes or one or more wide angular prediction modes.

In some embodiments, to determine one or more first candidate prediction blocks corresponding to the coding block using one or more prediction modes, the at least one processor may determine that at least one of the one or more prediction modes may be a wide angular prediction mode. The at least one processor may also divide the coding block into a first sub-block and a second sub-block. The at least one processor may also determine, based on the first sub-block, the second sub-block and the wide angular prediction mode, one of the one or more first candidate prediction blocks corresponding to the coding block.

In some embodiments, the coding block may include a first side and a second side that may be less than the first side. To divide the coding block into a first sub-block and a second sub-block, the at least one processor may divide, based on a division line, the coding block into the first sub-block and the second sub-block. The division line may be parallel to the second side.

In some embodiments, to determine, based on the first sub-block, the second sub-block, and the wide angular prediction mode, one of the one or more first candidate prediction blocks corresponding to the coding block, the at least one processor may determine a first prediction sub-block corresponding to the first sub-block using a conventional angular prediction mode corresponding to the wide angular prediction mode. The at least one processor may also determine a second prediction sub-block corresponding to the second sub-block using the wide angular prediction mode or an angular prediction mode. A prediction direction of the angular prediction mode may be opposite to a prediction direction of the conventional angular prediction mode. Two sides of the first sub-block may be adjacent to a first portion of the plurality of reference pixels, while only one side of the second sub-block may be adjacent to a second portion of the plurality of reference pixels of the coding block.

In some embodiments, the reference region may include a plurality of pixels in a reference image that may be encoded before the coding block.

According to another aspect of the present disclosure, a system may be provided. The system may include at least one storage medium including a set of instructions and at least one processor to communicate with the at least one storage medium. When executing the set of instructions, the at least one processor may obtain a coding block in an image. The at least one processor may obtain a coding block in an image. The coding block may include a first side and a second side that may be shorter than the first side. The at least one processor may determine, based on the coding block, at least one wide angular prediction mode. The at least one processor may divide the coding block into a first sub-block and a second sub-block. The at least one processor may determine, based at least in part on the first sub-block, the second sub-block and the at least one wide angular prediction mode, a prediction block corresponding to the coding block.

In some embodiments, to divide the coding block into a first sub-block and a second sub-block, the at least one processor may divide, based on a division line, the coding block into the first sub-block and the second sub-block. The division line may be parallel to the second side.

In some embodiments, to determine, based on the coding block, at least one wide angular prediction mode, the at least one processor may obtain at least one conventional angular prediction mode associated with the coding block. The at least one processor may also determine a ratio of a width and a height of the coding block. The at least one processor may also determine, based on the ratio of the width and the height of the coding block and the at least one conventional angular prediction mode, the at least one wide angular prediction mode corresponding to the at least one conventional angular prediction mode.

In some embodiments, to determine, based at least in part on the first sub-block, the second sub-block and the at least one wide angular prediction mode, a prediction block corresponding to the coding block, the at least one processor may determine a first prediction sub-block corresponding to the first sub-block using the at least one conventional angular prediction mode corresponding to the at least one wide angular prediction mode. The at least one processor may also determine a second prediction sub-block corresponding to the second sub-block using the at least one wide angular prediction mode or an angular prediction mode. The at least one processor may also determine, based at least in part on the first prediction sub-block and the second prediction sub-block, the prediction block corresponding to the coding block. A prediction direction of the angular prediction mode may be opposite to a prediction direction of the at least one conventional angular prediction mode. Two adjacent sides of the first sub-block may be adjacent to a first portion of a plurality of reference pixels of the coding block, while only one side of the second sub-block may be adjacent to a second portion of the plurality of reference pixels of the coding block.

In some embodiments, to determine, based at least in part on the first sub-block, the second sub-block and the at least one wide angular prediction mode, a prediction block corresponding to the coding block, the at least one processor may determine one or more first candidate prediction blocks corresponding to the coding block using one or more prediction modes. The at least one processor may also determine, based on the first prediction sub-block and the second prediction sub-block, a second candidate prediction block corresponding to the coding block. The at least one processor may also determine the prediction block corresponding to the coding block based on the one or more first candidate prediction blocks and the second candidate prediction block.

In some embodiments, the one or more prediction modes may include a planar prediction mode, a DC prediction mode, one or more conventional angular prediction modes, or one or more block-matching prediction modes each of which corresponds to a searching template.

In some embodiments, to determine one or more first candidate prediction blocks corresponding to the coding block using one or more prediction modes, for each of the one or more block-matching prediction modes, the at least one processor may determine, based on the coding block, a searching template corresponding to the coding block. The at least one processor may also determine, based on the searching template, one or more candidate blocks from a reference region. The reference region may include a plurality of reference pixels that are encoded. The at least one processor may also determine a reference block corresponding to the searching template from the one or more candidate blocks. The at least one processor may also determine, based on the reference block, one of the one or more first candidate prediction blocks corresponding to the coding block.

According to another aspect of the present disclosure, a system may be provided. The system may include at least one storage medium including a set of instructions and at least one processor to communicate with the at least one storage medium. When executing the set of instructions, the at least one processor may obtain a coding block in an image. The at least one processor may also determine one or more first candidate prediction blocks corresponding to the coding block using one or more first prediction modes. Each of the one or more first prediction modes may be associated with a plurality of first reference pixels in the image distributed along two adjacent sides of the coding block. The at least one processor may also determine one or more second candidate prediction blocks corresponding to the coding block using one or more second prediction modes. Each of the one or more second prediction modes may be associated with a reference block. The reference block may match with the coding block. The reference block may be an image block in a reference region including a plurality of second reference pixel that includes the plurality of first reference pixels. The at least one processor may also determine, based on the one or more first prediction blocks and the one or more second candidate prediction blocks, a target prediction block corresponding to the coding block.

According to another aspect of the present disclosure, a method implemented on a computing device including at least one processor and at least one storage medium may be provided. The method may include obtaining a coding block in an image. The method may also include determining, based on the coding block, one or more searching templates corresponding to the coding block. For each of the one or more searching templates, the method may include determining, based on the searching template, one or more candidate blocks from a reference region and determining a reference block corresponding to the searching template from the one or more candidate blocks. The reference region may include a plurality of reference pixels that are encoded. The method may also include determining, based at least in part on one or more reference blocks, a prediction block corresponding to the coding block.

According to another aspect of the present disclosure, a system may be provided. The system may include an obtaining module configured to obtain a coding block in an image. The system may also include a template determination module configured to determine, based on the coding block, one or more searching templates corresponding to the coding block. The system may also include a reference block determination module configured to, for each of the one or more searching templates, determine, based on the searching template, one or more candidate blocks from a reference region and determine a reference block corresponding to the searching template from the one or more candidate blocks. The reference region may include a plurality of reference pixels that are encoded. The system may also include a prediction determination module configured to determine, based at least in part on one or more reference blocks, a prediction block corresponding to the coding block.

According to another aspect of the present disclosure, a non-transitory computer readable medium may be provided. The non-transitory computer readable medium may include executable instructions that, when executed by at least one processor, direct the at least one processor to perform a method. The method may include obtaining a coding block in an image. The method may also include determining, based on the coding block, one or more searching templates corresponding to the coding block. For each of the one or more searching templates, the method may include determining, based on the searching template, one or more candidate blocks from a reference region and determining a reference block corresponding to the searching template from the one or more candidate blocks. The reference region may include a plurality of reference pixels that are encoded. The method may also include determining, based at least in part on one or more reference blocks, a prediction block corresponding to the coding block.

According to another aspect of the present disclosure, a method implemented on a computing device including at least one processor and at least one storage medium may be provided. The method may include obtaining a coding block in an image. The coding block may include a first side and a second side that may be shorter than the first side. The method may also include determining, based on the coding block, at least one wide angular prediction mode. The method may also include dividing the coding block into a first sub-block and a second sub-block. The method may also include determining, based at least in part on the first sub-block, the second sub-block and the at least one wide angular prediction mode, a prediction block corresponding to the coding block.

According to another aspect of the present disclosure, a system may be provided. The system may include, may include an obtaining module configured to obtain a coding block in an image, the coding block including a first side and a second side that may be shorter than the first side. The system may also include a division module configured to divide the coding block into a first sub-block and a second sub-block. The system may include a determination module configured to determine, based on the coding block, at least one wide angular prediction mode and determine, based at least in part on the first sub-block, the second sub-block and the at least one wide angular prediction mode, a prediction block corresponding to the coding block.

According to another aspect of the present disclosure, a non-transitory computer readable medium i may be provided. The non-transitory computer readable medium may include executable instructions that, when executed by at least one processor, direct the at least one processor to perform a method. The method may include obtaining a coding block in an image. The coding block may include a first side and a second side that may be shorter than the first side. The method may also include determining, based on the coding block, at least one wide angular prediction mode. The method may also include dividing the coding block into a first sub-block and a second sub-block. The method may also include determining, based at least in part on the first sub-block, the second sub-block and the at least one wide angular prediction mode, a prediction block corresponding to the coding block.

According to another aspect of the present disclosure, a method implemented on a computing device including at least one processor and at least one storage medium may be provided. The method may include obtaining a coding block in an image. The method may also include determining one or more first candidate prediction blocks corresponding to the coding block using one or more first prediction modes. Each of the one or more first prediction modes may be associated with a plurality of first reference pixels in the image distributed along two adjacent sides of the coding block. The method may also include determining one or more second candidate prediction blocks corresponding to the coding block using one or more second prediction modes. Each of the one or more second prediction modes may be associated with a reference block. The reference block may match with the coding block. The reference block may be an image block in a reference region including a plurality of second reference pixel that includes the plurality of first reference pixels. The method may also include determining, based on the one or more first prediction blocks and the one or more second candidate prediction blocks, a target prediction block corresponding to the coding block.

According to another aspect of the present disclosure, a non-transitory computer readable medium i may be provided. The non-transitory computer readable medium may include executable instructions that, when executed by at least one processor, direct the at least one processor to perform a method. The method may include obtaining a coding block in an image. The method may also include determining one or more first candidate prediction blocks corresponding to the coding block using one or more first prediction modes. Each of the one or more first prediction modes may be associated with a plurality of first reference pixels in the image distributed along two adjacent sides of the coding block. The method may also include determining one or more second candidate prediction blocks corresponding to the coding block using one or more second prediction modes. Each of the one or more second prediction modes may be associated with a reference block. The reference block may match with the coding block. The reference block may be an image block in a reference region including a plurality of second reference pixel that includes the plurality of first reference pixels. The method may also include determining, based on the one or more first prediction blocks and the one or more second candidate prediction blocks, a target prediction block corresponding to the coding block.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIGS. 14A and 14B show exemplary division directions of a coding block according to some embodiments of the present disclosure;

FIGS. 15A and 15B show exemplary division directions of a coding block according to some embodiments of the present disclosure;

DETAILED DESCRIPTION

Figure 1:
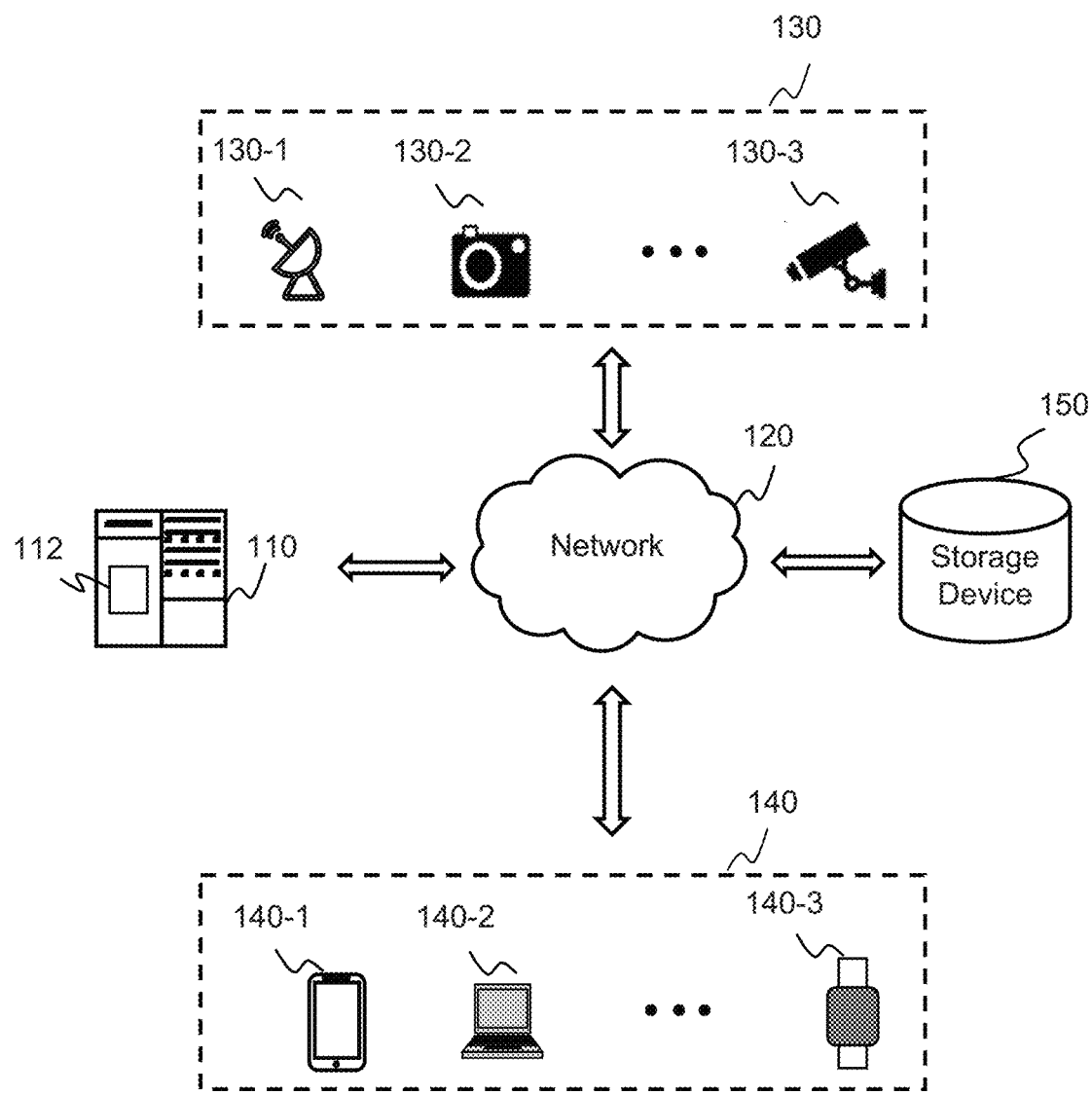
FIG. 1 is a schematic diagram illustrating an exemplary image coding system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the terms "system," "engine," "unit," "module," and/or "block" used herein are one method to distinguish different components, elements, parts, sections, or assemblies of different levels in ascending order. However, the terms may be displaced by other expression if they may achieve the same purpose.

Generally, the words "module," "unit," or "block" used herein, refer to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 220 illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, an engine, a module, or a block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In addition, it should be understood that in the description of the present disclosure, the terms "first", "second", or the like, are only used for the purpose of differentiation, and cannot be interpreted as indicating or implying relative importance, nor can be understood as indicating or implying the order.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

An aspect of the present disclosure relates to a system and method for prediction associated with bock-matching prediction modes. The system may obtain a coding block in an image. The system may determine, based on the coding block, one or more searching templates corresponding to the coding block. For each of the one or more searching templates, the system may determine, based on the searching template, one or more candidate blocks from a reference region and determine a reference block corresponding to the searching template from the one or more candidate blocks. The reference region may include a plurality of reference pixels that are encoded. The system may determine, based at least in part on one or more reference blocks, a prediction block corresponding to the coding block.

Another aspect of the present disclosure relates to a system and method for prediction associated with wide angular prediction modes. The system may obtain a coding block in an image, the coding block including a first side and a second side that is shorter than the first side. The system may determine, based on the coding block, at least one wide angular prediction mode. The system may divide the coding block into a first sub-block and a second sub-block. The system may determine, based at least in part on the first sub-block, the second sub-block and the at least one wide angular prediction mode, a prediction block corresponding to the coding block.

According to some embodiments of the present disclosure, in a block-matching prediction mode, all encoded pixels in a current image (or a reference image encoded before the current image) of a video may be used for predicting a coding block, which enlarges a range of the reference pixels. In addition, a prediction block corresponding to the coding block may be determined in a reference region in combination with the image content and luminance and chrominance signals of the coding block, which may reduce the bit overhead for residual encoding and improve the compression rate of encoding, thereby removing spatial redundancy. In some embodiments, when the coding block is a non-square block (e.g., a rectangle block), a wide angular prediction mode may be used for prediction. In such occasions, the coding block may be divided into at least two sub-blocks. The correlation between each of the at least two sub-blocks and reference pixels of the coding block may be different. The at least two sub-blocks may be predicted using different prediction modes associated with the wide angular prediction mode for prediction, which may reduce spatial redundancy and improve the compression rate of encoding.

FIG. 1 is a schematic diagram illustrating an exemplary image coding system according to some embodiments of the present disclosure. As shown, the image coding system 100 may include a server 110, a network 120, an acquisition device 130, a user device 140, and a storage device 150.

The server 110 may be a single server or a server group. The server group may be centralized or distributed (e.g., the server 110 may be a distributed system). In some embodiments, the server 110 may be local or remote. For example, the server 110 may access information and/or data stored in the acquisition device 130, the user device 140, and/or the storage device 150 via the network 120. As another example, the server 110 may be directly connected to the acquisition device 130, the user device 140, and/or the storage device 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 including one or more components illustrated in FIG. 2 of the present disclosure.

In some embodiments, the server 110 may include a processing device 112. The processing device 112 may process information and/or data relating to image coding to perform one or more functions described in the present disclosure. For example, the processing device 112 may obtain a coding block in an image. The processing device 112 may determine one or more candidate prediction blocks corresponding to the coding block using one or more prediction modes. The processing device 112 may determine a target prediction block corresponding to the coding block based on the one or more candidate prediction blocks. Further, the processing device 112 may code the coding block based on the target prediction block. As another example, the processing device 112 may determine one or more searching templates corresponding to the coding block based on the coding block. For each of the one or more searching templates, the processing device 112 may determine one or more candidate blocks from a reference region based on the searching template and determine a reference block corresponding to the searching template from the one or more candidate blocks. The processing device 112 may determine one or more candidate prediction blocks corresponding to the coding block based on one or more reference blocks. As still another example, when the coding block is a non-square block, the processing device 112 may determine at least one wide angular prediction mode based on the coding block. The processing device 112 may divide the coding block into a first sub-block and a second sub-block. The processing device 112 may determine a candidate prediction block corresponding to the coding block based on the first sub-block, the second sub-block and the at least one wide angular prediction mode. In some embodiments, the processing device 112 may include one or more processing devices (e.g., single-core processing device(s) or multi-core processor(s)). Merely by way of example, the processing device 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiment, the sever 110 may be unnecessary and all or part of the functions of the server 110 may be implemented by other components (e.g., the acquisition device 130, the user device 140) of the image coding system 100. For example, the processing device 112 may be integrated into the acquisition device 130 or the user device 140 and the functions (e.g., determining a prediction block corresponding to the coding block) of the processing device 112 may be implemented by the acquisition device 130 or the user device 140.

The network 120 may facilitate exchange of information and/or data for the image coding system 100. In some embodiments, one or more components (e.g., the server 110, the acquisition device 130, the user device 140, the storage device 150) of the image coding system 100 may transmit information and/or data to other component(s) of the image coding system 100 via the network 120. For example, the server 110 may obtain an image to be coded from the acquisition device 130 via the network 120. As another example, the server 110 may obtain one or more prediction modes associated with the image coding from the storage device 150. As a further example, the server 110 may transmit a coded image to the user device 140 via the network 120. In some embodiments, the network 120 may be any type of wired or wireless network, or combination thereof. Merely by way of example, the network 120 may include a cable network (e.g., a coaxial cable network), a wireline network, an optical fiber network, a telecommunications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof.

The acquisition device 130 may be configured to acquire an image (the "image" herein refers to a single image or a frame of a video). In some embodiments, the acquisition device 130 may include a camera 130-1, a video recorder 130-2, an image sensor 130-3, etc. The camera 130-1 may include a gun camera, a dome camera, an integrated camera, a monocular camera, a binocular camera, a multi-view camera, or the like, or any combination thereof. The video recorder 130-2 may include a PC Digital Video Recorder (DVR), an embedded DVR, or the like, or any combination thereof. The image sensor 130-3 may include a Charge Coupled Device (CCD), a Complementary Metal Oxide Semiconductor (CMOS), or the like, or any combination thereof. The image acquired by the acquisition device 130 may be a two-dimensional image, a three-dimensional image, a four-dimensional image, etc. In some embodiments, the acquisition device 130 may include a plurality of components each of which can acquire an image. For example, the acquisition device 130 may include a plurality of sub-cameras that can capture images or videos simultaneously. In some embodiments, the acquisition device 130 may transmit the acquired image to one or more components (e.g., the server 110, the user device 140, the storage device 150) of the image coding system 100 via the network 120.

The user device 140 may be configured to receive information and/or data from the server 110, the acquisition device 130, and/or the storage device 150 via the network 120. For example, the user device 140 may receive a coded image from the server 110. In some embodiments, the user device 140 may process information and/or data received from the server 110, the acquisition device 130, and/or the storage device 150 via the network 120. For example, the user device 140 may decode the coded image received from the server 110. In some embodiments, the user device 140 may provide a user interface via which a user may view information and/or input data and/or instructions to the image coding system 100. For example, the user may view the decoded image via the user interface. As another example, the user may input an instruction associated with an image coding parameter via the user interface. In some embodiments, the user device 140 may include a mobile phone 140-1, a computer 140-2, a wearable device 140-3, or the like, or any combination thereof. In some embodiments, the user device 140 may include a display that can display information in a human-readable form, such as text, image, audio, video, graph, animation, or the like, or any combination thereof. The display of the user device 140 may include a cathode ray tube (CRT) display, a liquid crystal display (LCD), a light emitting diode (LED) display, a plasma display panel (PDP), a three dimensional (3D) display, or the like, or a combination thereof. In some embodiments, the user device 140 may be connected to one or more components (e.g., the server 110, the acquisition device 130, the storage device 150) of the image coding system 100 via the network 120.

The storage device 150 may be configured to store data and/or instructions. The data and/or instructions may be obtained from, for example, the server 110, the acquisition device 130, the user device 140, and/or any other component of the image coding system 100. In some embodiments, the storage device 150 may store data and/or instructions that the server 110 may execute or use to perform exemplary methods described in the present disclosure. For example, the storage device 150 may store one or more prediction modes associated with the image coding. In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components (e.g., the server 110, the acquisition device 130, the user device 140) of the image coding system 100. One or more components of the image coding system 100 may access the data or instructions stored in the storage device 150 via the network 120. In some embodiments, the storage device 150 may be directly connected to or communicate with one or more components (e.g., the server 110, the acquisition device 130, the user device 140) of the image coding system 100. In some embodiments, the storage device 150 may be part of other components of the image coding system 100, such as the server 110, the acquisition device 130, or the user device 140.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more components of the image coding system 100 may be integrated into one component or be omitted. For example, the acquisition device 130 may be a part of the user device 140.

Figure 2:
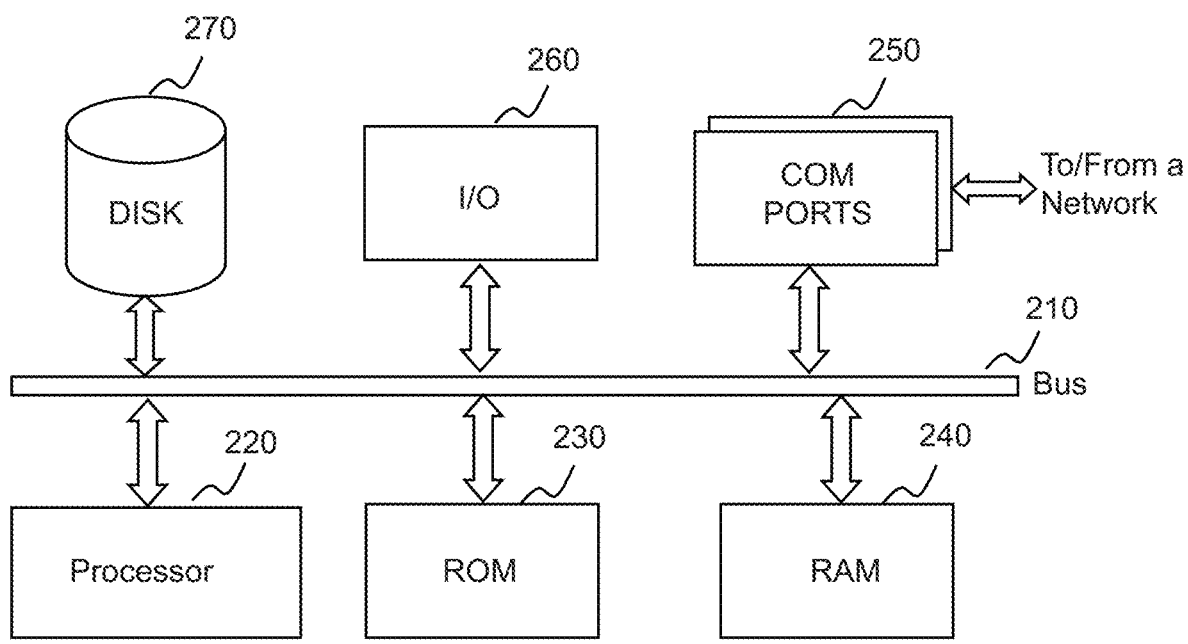
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the server 110 may be implemented on the computing device 200. For example, the processing device 112 may be implemented on the computing device 200 and configured to perform functions of the processing device 112 disclosed in this disclosure.

The computing device 200 may be used to implement any component of the image coding system 100 as described herein. For example, the processing device 112 may be implemented on the computing device 200, via its hardware, software program, firmware, or a combination thereof. Although only one such computer is shown, for convenience, the computer functions relating to image coding as described herein may be implemented in a distributed fashion on a number of similar platforms to distribute the processing load.

The computing device 200, for example, may include COM ports 250 connected to and from a network connected thereto to facilitate data communications. The computing device 200 may also include a processor (e.g., a processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms including, for example, a disk 270, a read-only memory (ROM) 230, or a random-access memory (RAM) 240, for storing various data files to be processed and/or transmitted by the computing device 200. The computing device 200 may also include program instructions stored in the ROM 230, RAM 240, and/or another type of non-transitory storage medium to be executed by the processor 220. The methods and/or processes of the present disclosure may be implemented as the program instructions. The computing device 200 may also include an I/O component 260, supporting input/output between the computing device 200 and other components. The computing device 200 may also receive programming and data via network communications.

Merely for illustration, only one processor is illustrated in FIG. 2. Multiple processors 220 are also contemplated; thus, operations and/or method steps performed by one processor 220 as described in the present disclosure may also be jointly or separately performed by the multiple processors. For example, if in the present disclosure the processor 220 of the computing device 200 executes both step A and step B, it should be understood that step A and step B may also be performed by two different processors 220 jointly or separately in the computing device 200 (e.g., a first processor executes step A and a second processor executes step B, or the first and second processors jointly execute steps A and B).

Figure 3:
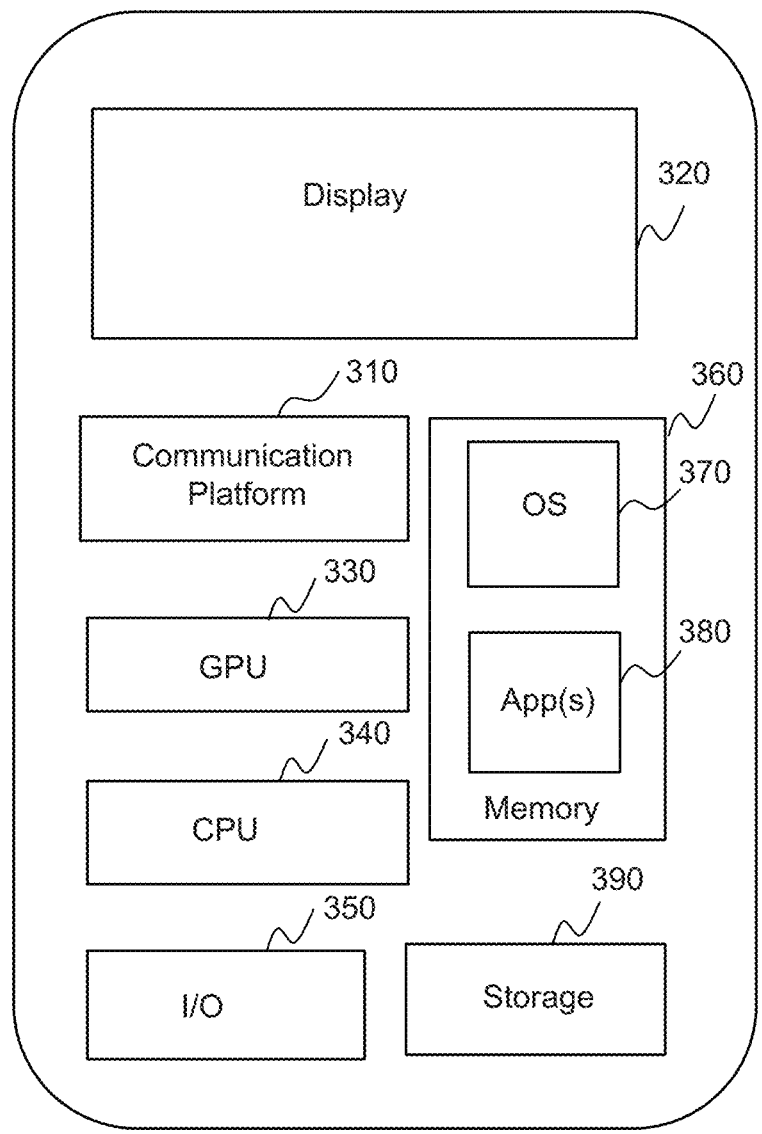
FIG. 3 is a schematic diagram illustrating exemplary hardware and/or software components of an exemplary terminal device according to some embodiments of the present disclosure.

FIG. 3 is a schematic diagram illustrating exemplary hardware and/or software components of an exemplary terminal device according to some embodiments of the present disclosure. In some embodiments, the user device 140 may be implemented on the terminal device 300 shown in FIG. 3.

As illustrated in FIG. 3, the terminal device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the terminal device 300.

In some embodiments, an operating system 370 (e.g., iOS™, Android™, Windows Phone™) and one or more applications (Apps) 380 may be loaded into the memory 360 from the storage 390 in order to be executed by the CPU 340. The applications 380 may include a browser or any other suitable mobile apps for receiving and rendering information relating to image coding or other information from the processing device 112. User interactions may be achieved via the I/O 350 and provided to the processing device 112 and/or other components of the image coding system 100 via the network 120.

Figure 4:
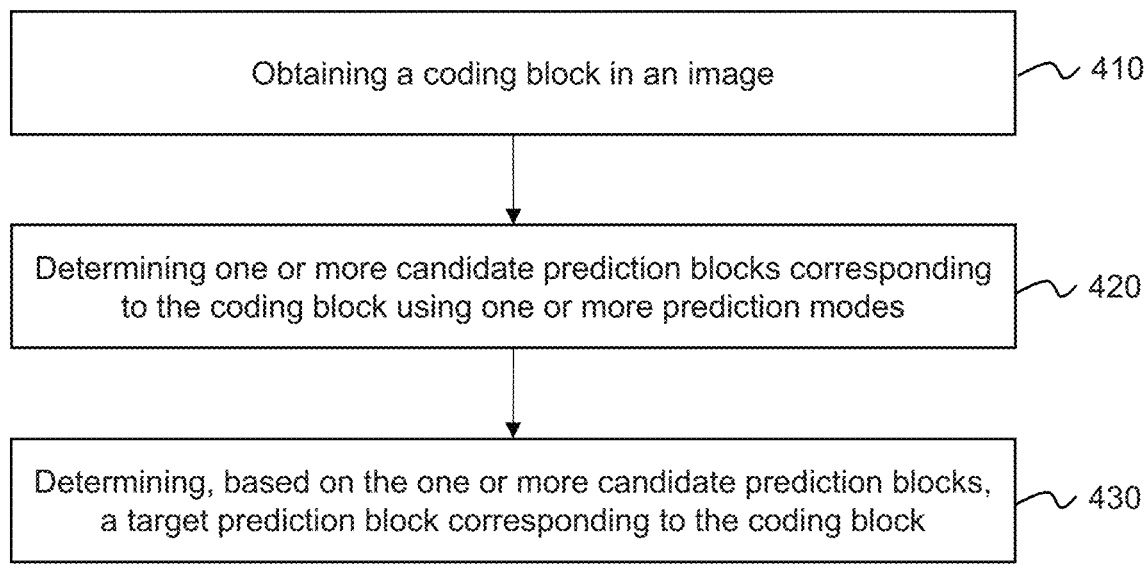
FIG. 4 is a schematic diagram illustrating an exemplary process for prediction according to some embodiments of the present disclosure.

FIG. 4 is a schematic diagram illustrating an exemplary process for prediction according to some embodiments of the present disclosure. In some embodiments, the process 400 may be implemented as a set of instructions (e.g., an application) stored in a storage device (e.g., the storage device 150, the ROM 230 or RAM 240). The processing device 112 (e.g., the processor 220, the CPU 340, and/or modules in FIG. 7 and/or FIG. 12 may execute the set of instructions, and when executing the instructions, the processor 220, the CPU 340, and/or the modules may be configured to perform the process 400. The operations of the illustrated process presented below are intended to be illustrative. In some embodiments, the process 400 may be accomplished with one or more additional operations not described and/or without one or more of the operations herein discussed. Additionally, the order in which the operations of the process as illustrated in FIG. 4 and described below is not intended to be limiting.

In 410, the processing device 112 may obtain a coding block in an image.

The image may be a discrete image or a video frame to be encoded. In some embodiments, the image may be divided into a plurality of image blocks to be coded according to a coding order (e.g., a coding order that is from left to right and from top to bottom). As used herein, the coding block (also be referred to as a "current block" or a "coding unit (CU)") refers to an image block to be coded according to the coding order. In some embodiments, the coding block may include a square block or a non-square block (e.g., a rectangle block). The coding block may include a size, such as 4×4, 8×8, 16×8, 8×16, etc. In some embodiments, the sizes of the plurality of coding blocks may be the same or different. For example, the numbers (or counts) of the pixels included in the plurality of coding blocks may be the same or different. In some embodiments, the shapes of the plurality of coding blocks may be the same or different.

In some embodiments, the processing device 112 may obtain the coding block in the image from one or more components of the image coding system 100 (e.g., the storage device 150, the acquisition device 130).

In 420, the processing device 112 may determine one or more candidate prediction blocks corresponding to the coding block using one or more prediction modes. Each of the one or more candidate prediction blocks may include a plurality of prediction values of pixels in the coding block.

In some embodiments, the one or more prediction modes may include a planar prediction mode, a DC prediction mode, one or more angular prediction modes (also referred to as angle prediction mode or angle mode), one or more block-matching prediction modes, or the like, or any combination thereof. In some embodiments, the planar prediction mode, the DC prediction mode, and/or the one or more angular prediction modes may also be referred to as traditional prediction modes or traditional intra prediction modes.

The planar prediction mode may be used for coding one or more regions (e.g., the coding block) of the image with relatively smooth image textures and relatively gradual gradients of pixel values. For example, using the planar prediction mode, for each pixel in the coding block, the processing device 112 may determine, based on four directions including upper, lower, left, and right corresponding to the each pixel, reference pixels on one or more reference lines distributed along two adjacent boundaries of the coding block. The processing device 112 may determine a prediction value of the each pixel based on an average value of the reference pixels. The processing device 112 may determine a candidate prediction block of the coding block based on the prediction value of the each pixel.

The DC prediction mode may be used for one or more regions (e.g., the coding block) of the image that is relatively smooth, with smooth textures, and relatively small gradients of pixel values. For example, using the DC prediction mode, the processing device 112 may determine an average value of reference pixels on one or more reference lines distributed along two adjacent sides of the coding block (e.g., a left side and an upper side). The processing device 112 may determine, based on the average value of the reference pixels, each of prediction values of pixels in the coding block for determining a candidate prediction block.

Figure 5:
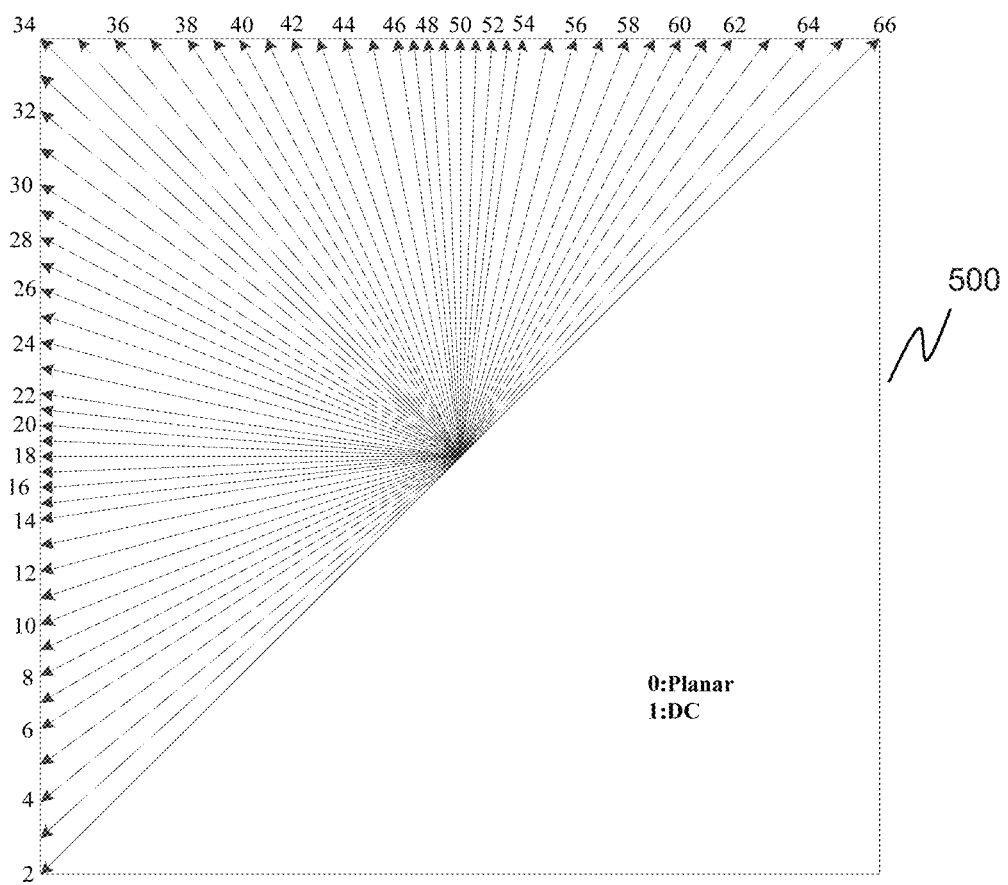
FIG. 5 is a schematic diagram illustrating exemplary angular prediction modes according to some embodiments of the present disclosure.
Figure 6:
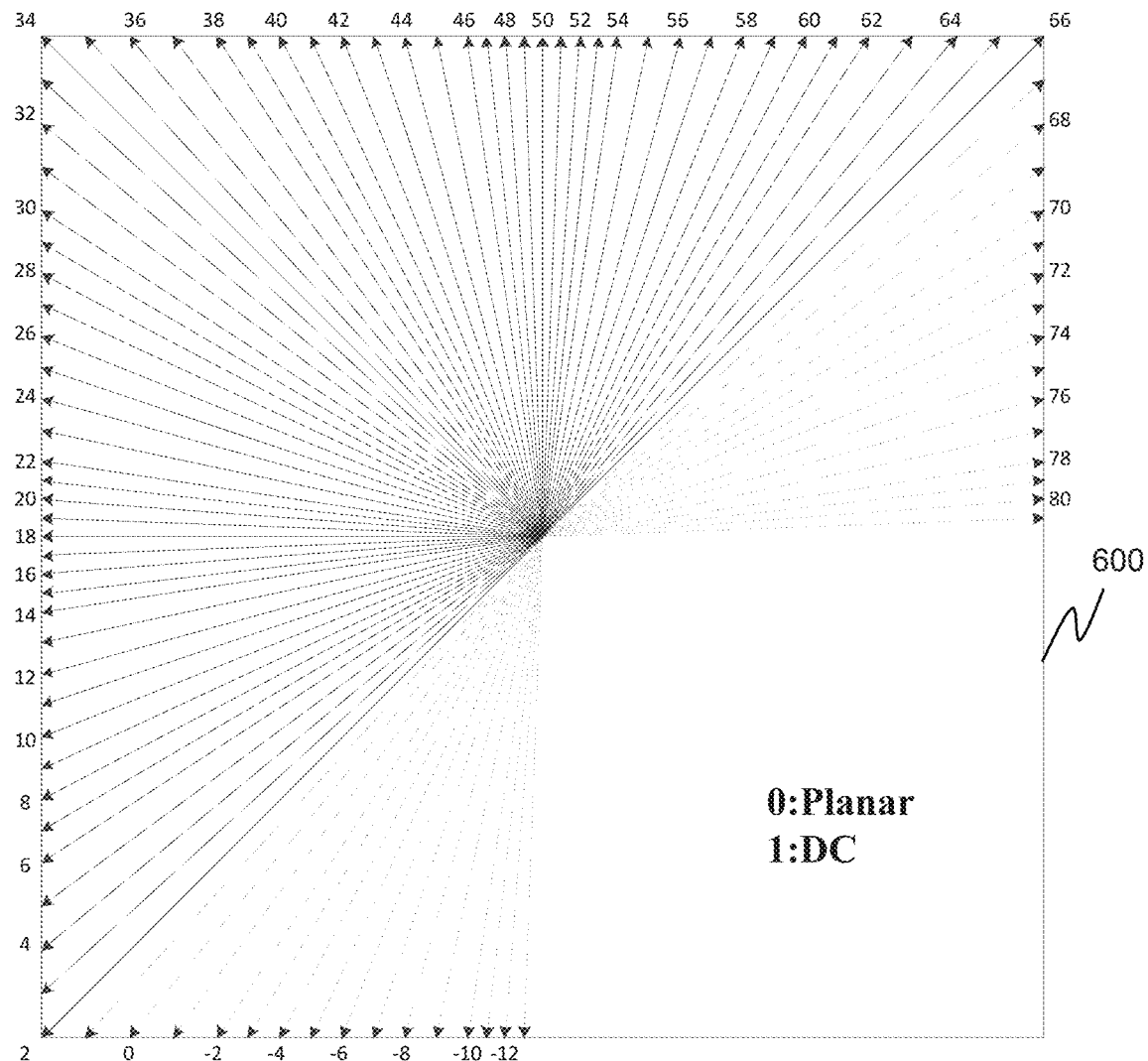
FIG. 6 is a schematic diagram illustrating exemplary angular prediction modes according to some embodiments of the present disclosure.

Each of the one or more angular prediction modes may correspond to a prediction direction (also referred to as an angle direction) (e.g., a prediction direction an arrow points in FIG. 5 or 6). Different angular prediction modes may correspond to different prediction directions. Using an angular prediction mode, the processing device 112 may determine reference pixels on one or more reference lines based on the prediction direction. For each pixel in the coding block, if a projection location of a pixel in the coding block along the prediction direction to one of the one or more reference lines covers a reference pixel, the processing device 112 may designate a value of the reference pixel as an intermediate prediction value of the pixel. Alternatively, if the projection location of the pixel in the coding block along the prediction direction to one of the one or more reference lines is located between two adjacent reference pixels, the processing device 112 may determine the intermediate prediction value of the pixel by interpolating values of the two adjacent reference pixels. The processing device 112 may determine a prediction value of the pixel based on the intermediate prediction value of the pixel corresponding to each of the one or more reference lines. The processing device 112 may determine a candidate prediction block based on the prediction value of each pixel in the coding block.

In some embodiments, the one or more angular prediction modes may include one or more conventional angular prediction modes (also referred to as normal conventional angular prediction modes, or ordinary angular prediction modes) and/or one or more wide angular prediction modes. Each of the conventional angular prediction modes may correspond to a prediction direction that points to a first side or a second side of the coding block. The first side and the second side of the coding block may refer to two adjacent sides (e.g., a left side and an upper side) of the coding block. The prediction direction of a conventional angular prediction mode angular mode may be defined by a prediction angle between the prediction direction and a horizontal direction (e.g., a direction from right to left in FIG. 5)) that is within an angle range from −45° to 135°. Each of the one or more wide angular prediction modes may correspond to a prediction angle that is outside the angle range. A prediction angle formed by a bottom-left diagonal direction (e.g., a prediction direction corresponding to sequence number 2 in FIG. 5) and the horizontal direction is designated as −45° and a prediction angle formed by a top-right diagonal direction (e.g., a prediction direction corresponding to sequence number 66 in FIG. 5) and the horizontal direction is designated as 135°. In some embodiments, the processing device 112 may determine whether the coding block is a square block. In response to a determination that the coding block is a square block, the processing device 112 may use the one or more conventional angular modes for predicting the coding block to obtain one or more candidate prediction modes. In response to a determination that the coding block is a non-square block (e.g., a rectangle block), the processing device 112 may replace a portion of the one or more conventional angular modes by a portion of the one or more wide angular prediction modes for predicting the coding block to obtain one or more candidate prediction modes. In some embodiments, using a wide angular prediction mode, the processing device 112 may directly predict the coding block using the wide angular prediction mode for determining a candidate prediction block. Alternatively, the processing device 112 may divide the coding block into at least two sub-blocks. The processing device 112 may determine the candidate prediction block based on the at least two sub-blocks. For example, the processing device 112 may respectively predict the at least two sub-blocks using different prediction modes associated with the wide angular prediction mode for determining the candidate prediction block. More descriptions regarding the one or more angular prediction modes may be found elsewhere in the present disclosure (e.g., FIGS. 5-6, 12-17 and the descriptions thereof).

Using a block-matching prediction mode, the processing device 112 may determine at least one reference block in the image or one or more video frames prior to the image in a video. The reference block may include a plurality of reference pixels that have been encoded. The processing device 112 may determine a candidate prediction block of the coding block based on the reference block. In some embodiments, the processing device 112 may determine, based on a searching template, the reference block from a reference region that includes a plurality of reference pixels that have been encoded. Each of the one or more block-matching prediction modes may correspond to a searching template. Different block-matching prediction modes may correspond to different searching template. The processing device 112 may determine the reference block corresponding to the searching template from one or more candidate blocks in the reference region by matching a candidate block with the searching template. The processing device 112 may determine a candidate prediction block based on the reference block. More descriptions regarding the one or more block-matching prediction modes may be found elsewhere in the present disclosure (e.g., FIGS. 7-11 and the descriptions thereof).

In some embodiments, the one or more prediction modes may include one or more first prediction modes and one or more second prediction modes. Using a first prediction mode, one or more reference lines distributed along two adjacent sides of the coding block may be determined for encoding the coding block. A reference line may include a plurality of reference pixels (also referred to as first reference pixels). A candidate prediction block (also referred to as first candidate prediction block) determined using the first prediction mode may include a plurality of prediction values each of which corresponds to a pixel in the coding block. A prediction value corresponding to a pixel in the coding block may be determined based on a projection of the pixel on the one or more reference lines along one or more projection directions. For example, the one or more first prediction modes may include the planar prediction mode, the DC prediction mode, one or more angular prediction modes, etc.

Using a second prediction mode, a reference block corresponding to the coding block may be determined for encoding the coding block. A reference block may include a plurality of reference pixels (also referred to as second reference pixels). A candidate prediction block (also referred to as second candidate prediction block) determined using the second prediction mode may include a plurality of prediction values each of which corresponds to a pixel in the coding block. A prediction value corresponding to a pixel in the coding block may be determined based on at least a portion of the plurality of second reference pixels in the reference block. For example, the one or more second prediction modes may include one or more block-matching modes corresponding to different searching templates, etc.

The one or more prediction modes may be stored in a storage device (e.g., the storage device 150) and the processing device 112 may retrieve the one or more prediction modes from the storage device.

In 430, the processing device 112 may determine a target prediction block (also referred to as an optimal prediction block) corresponding to the coding block based on the one or more candidate prediction blocks.

In some embodiments, for each of the one or more candidate prediction blocks (or for each of the one or more prediction modes), the processing device 112 may determine an evaluation index corresponding to the candidate prediction block (or the prediction mode). The processing device 112 may determine a candidate prediction block corresponding to the minimum value of the evaluation index as the target prediction block among the one or more candidate prediction blocks. The processing device 112 may determine a prediction mode corresponding to (i.e., used to determine) the target prediction block as an optimal prediction mode for the coding block. For example, the value of the evaluation index corresponding to a candidate prediction block (or a prediction mode) may include a rate-distortion cost (Rd-cost), which may be determined according to Equation (1):

$$Rdcost = D + \lambda * R, \tag{1}$$

wherein D and R respectively represent a distortion loss and the number (or count) of bits when the prediction mode is used to predict the coding block, and λ refers to a Lagrange coefficient.

In some embodiments, the processing device 112 may generate a coded image corresponding to the image based on target prediction blocks corresponding to a plurality of image blocks in the image and transmit the coded image to one or more components (e.g., the user device 140, the storage device 150) of the image coding system 100 to be further processed. For example, the processing device 112 may determine a residual based on a difference between the coding block and the target prediction block and encode the coding block into a bitstream by encoding the residual. As another example, the processing device 112 may determine a motion vector or a motion vector residual based on the coding block and the target prediction block and encode the coding block into a bitstream by encoding the motion vector or the motion vector residual. The processing device 112 may transmit the bitstream to the one or more components of the image coding system 100. As still another example, after receiving the coded image, the user device 140 may decode the coded image and display the decoded image.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional operations (e.g., a storing operation) may be added elsewhere in the process 400. In the storing operation, the processing device 112 may store information and/or data (e.g., the target prediction block) associated with the image coding in a storage device (e.g., the storage device 150) disclosed elsewhere in the present disclosure. As another example, the processing device 112 may determine whether a filtering operation (e.g., a smoothing filtering operation) needs to be performed on reference pixels based on a size of the coding block and/or a type of the prediction mode.

FIG. 5 is a schematic diagram illustrating exemplary conventional angular prediction modes according to some embodiments of the present disclosure. Intra-predication modes may include the planar prediction mode, the DC prediction mode, angular prediction modes each of which represents a prediction direction where an arrow points. Each of the prediction modes may be designated with an index (i.e., sequence number). As shown in FIG. 5, the planar prediction mode may correspond to a sequence number of "0", the DC prediction mode may correspond to a sequence number of "1", and the sequence numbers of the conventional angular modes may be 2-66. In some embodiments, each of the one or more conventional angular prediction modes may correspond to a specific sequence number within a range from 2 to F, wherein F is an integer larger than 2 (e.g., 34, 66).

FIG. 5 shows exemplary 65 conventional angular modes with sequence number 2-66. A prediction direction corresponding to an angular prediction mode with a sequence number "2" is a lower left direction (or a bottom-left diagonal direction for a square block 500), a prediction direction corresponding to an angular prediction mode with a sequence number "18" (also referred to as a horizontal angular mode (H)) is a horizontal direction, a prediction direction of an angular prediction mode with a sequence number "50" (also referred to as a vertical angular mode (V)) is a vertical direction, and a prediction direction corresponding to an angular prediction mode with a sequence number "66" is an upper right direction (or a top-right diagonal direction for the square block 500).

FIG. 6 is a schematic diagram illustrating exemplary angular prediction modes according to some embodiments of the present disclosure.

As shown in FIG. 6, angular prediction modes with sequence numbers within a range from 2 to 66 are conventional angular prediction modes, and angular prediction modes with sequence numbers outside the range (e.g., angular prediction modes with sequence numbers within a range from −13 to 1 and within a range from 67 to 81 as shown in FIG. 6) are wide angular prediction modes each of which represents a prediction direction where a dashed arrow points. For brevity, an angular prediction mode with a sequence number of "m" may also be referred to as angular mode m. In some embodiments, a prediction direction corresponding to a specific wide angular prediction mode may be related to a prediction direction corresponding to a specific conventional angular prediction mode. For example, angular mode 1 may correspond to a prediction direction which is opposite to that corresponding to angular mode 65. Angular mode 0 may correspond to a prediction direction which is opposite to that corresponding to angular mode 64. Angular mode −13 may correspond to a prediction direction which is opposite to that corresponding to angular mode 51. Angular mode 67 may correspond to a prediction direction which is opposite to that corresponding to angular mode 3. Angular mode 68 may correspond to a prediction direction which is opposite to that corresponding to angular mode 4. Angular mode 81 may correspond to a prediction direction which is opposite to that corresponding to angular mode 17. In some embodiments, a difference between sequence numbers of a wide angular prediction mode and a conventional angular prediction mode that correspond to opposite prediction diction may be equal to a constant, such as, 64.

Figure 7:
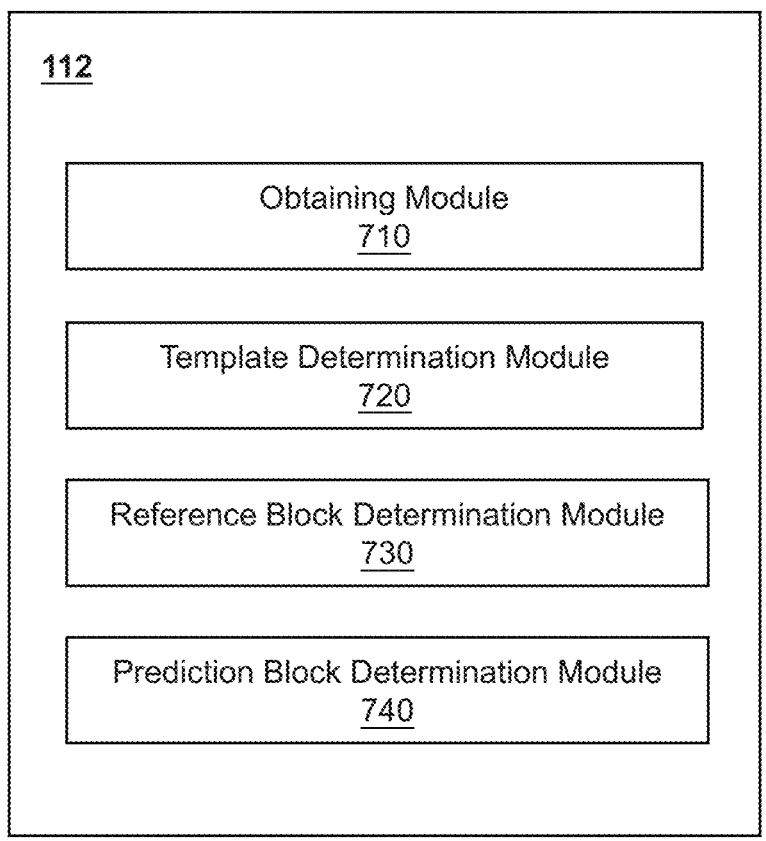
FIG. 7 is a block diagram illustrating an exemplary processing device according to some embodiments of the present disclosure.

FIG. 7 is a block diagram illustrating an exemplary processing device according to some embodiments of the present disclosure. The processing device 112 may include an obtaining module 710, a template determination module 720, a reference block determination module 730, and a prediction block determination module 740.

The obtaining module 710 may be configured to obtain data/information from one or more components of the image coding system 100. For example, the obtaining module 710 may obtain a coding block in an image from one or more components of the image coding system 100 (e.g., the storage device 150, the acquisition device 130). The coding block may include a square block or a non-square block. As another example, the obtaining module 710 may obtain one or more prediction modes (e.g., a planar prediction mode, a DC prediction mode, one or more angular prediction modes, or one or more block-matching prediction modes) from one or more components of the image coding system 100 (e.g., the storage device 150, the acquisition device 130).

The template determination module 720 may be configured to determine one or more searching templates corresponding to the coding block. For example, the template determination module 720 may determine a searching template based on the coding block and/or at least a portion of a plurality of reference pixels of the coding block. As another example, the template determination module 720 may obtain the one or more searching templates based on the one or more block-matching prediction modes and the coding block. In some embodiments, the one or more searching template may include a searching template of a first type, one or more searching templates of a second type, one or more searching templates of a third type, etc. More descriptions regarding determining the one or more searching templates may be found elsewhere in the present disclosure (e.g., operation 820 in FIG. 8 and the description thereof).

The reference block determination module 730 may be configured to determine a reference block corresponding to each of the one or more searching templates. In some embodiments, for each of the one or more searching templates the reference block determination module 730 may determine, based on the searching template, one or more candidate blocks from a reference region. The reference region may include a plurality of reference pixels that are encoded in the image or a reference image (e.g., a video frame) that has been already encoded before the image and is in the same video as the image. The one or more candidate blocks may include a same size (and shape) as the searching template. The reference block determination module 730 may determine the reference block reference block corresponding to the searching template from the one or more candidate blocks. A similarity degree between the reference block and the searching template is maximum among similarity degrees each of which is between the searching template and one of the one or more candidate blocks or the similarity degree between the reference block and the searching template exceeds a threshold (e.g., 0.9, 08., etc.). More descriptions regarding determining the one or more candidate blocks and the reference block may be found elsewhere in the present disclosure (e.g., operations 830 and 840 in FIG. 8 and the descriptions thereof).

The prediction block determination module 740 may be configured to determine a prediction of the coding block based at least in part on one or more reference blocks. In some embodiments, the prediction block determination module 740 may determine one or more first candidate prediction blocks of the coding block using one or more prediction modes (i.e., first prediction modes as descried in FIG. 4). The prediction block determination module 740 may determine, based on the one or more reference blocks, one or more second candidate prediction blocks of the coding block. Further, the prediction block determination module 740 may determine the prediction block (i.e., a target prediction block) of the coding block based on the one or more first prediction blocks and the one or more second prediction blocks (e.g., based on RD costs corresponding to the one or more first prediction blocks and the one or more second prediction blocks). In some embodiments, the prediction block determination module 740 may determine a mode corresponding to the target prediction block as an optimal prediction mode. More descriptions regarding determining the target prediction block of the coding block may be found elsewhere in the present disclosure (e.g., operation 850 in FIG. 5 and the description thereof).

The modules in the processing device 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units.

It should be noted that the above descriptions of the processing device 112 are merely provided for the purposes of illustration, and not intended to limit the scope of the present disclosure. For persons having ordinary skills in the art, various modifications and changes in the forms and details of the application of the above method and system may occur without departing from the principles of the present disclosure. However, those variations and modifications also fall within the scope of the present disclosure. In some embodiments, two or more of the modules (or units) may be combined into a single module (or unit), and any one of the modules may be divided into two or more units. For example, the obtaining module 710 and the template determination module 720 may be combined as a single module which may both obtain the coding block and determine the one or more searching templates. As another example, the reference block determination module 730 may be divide into two units, one of which may determine the one or more candidate blocks and another of which may determine the reference block from the one or more candidate blocks. In some embodiments, one or more optional modules may be added in the processing device 112. For example, the processing device 112 may include a transmission module configured to transmit signals (e.g., electrical signals, electromagnetic signals) to one or more components (e.g., the acquisition device 130, the user device 140, the storage device 150) of the image coding system 100. As a further example, the processing device 112 may include a storage module (not shown) used to store information and/or data (e.g., the one or more prediction modes, the prediction block corresponding to the coding block) associated with the image coding.

Figure 8:
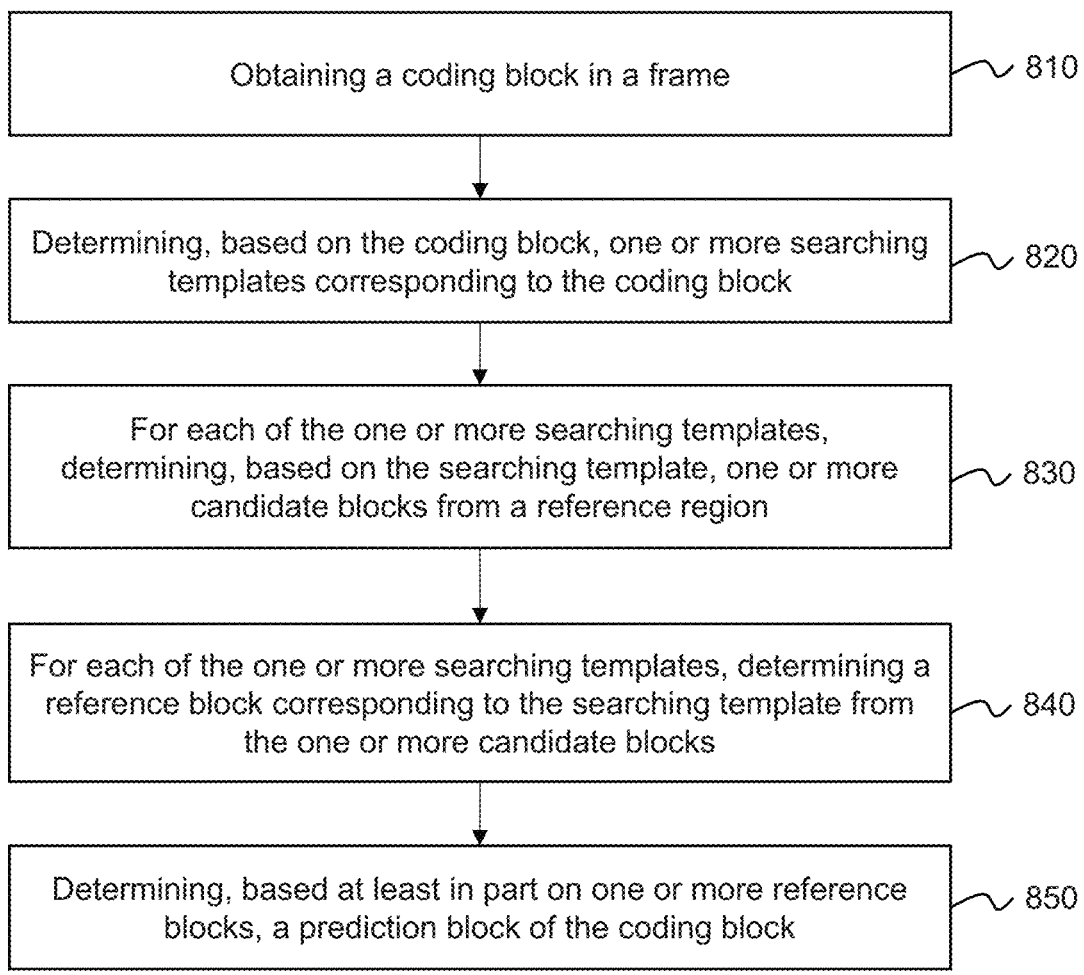
FIG. 8 is a schematic diagram illustrating an exemplary process for prediction according to some embodiments of the present disclosure

FIG. 8 is a schematic diagram illustrating an exemplary process for prediction according to some embodiments of the present disclosure. In some embodiments, the process 800 may be implemented as a set of instructions (e.g., an application) stored in a storage device (e.g., the storage device 150, the ROM 230 or RAM 240). The processing device 112 (e.g., the processor 220, the CPU 340, and/or the modules in FIG. 7) may execute the set of instructions, and when executing the instructions, the processor 220, the CPU 340, and/or the modules may be configured to perform the process 800. The operations of the illustrated process presented below are intended to be illustrative. In some embodiments, the process 800 may be accomplished with one or more additional operations not described and/or without one or more of the operations herein discussed. Additionally, the order in which the operations of the process as illustrated in FIG. 8 and described below is not intended to be limiting.

In 810, the processing device 112 (e.g., the obtaining module 710) may obtain a coding block in an image. Operation 810 may be the same as or similar to operation 410 as described in FIG. 4, and not repeated herein.

In 820, the processing device 112 (e.g., the template determination module 720) may determine, based on the coding block, one or more searching templates corresponding to the coding block.

In some embodiments, a searching template may be determined based on the coding block and/or at least a portion of a plurality of reference pixels of the coding block. As used herein, the plurality of reference pixels of the coding block may refer to pixels that have been encoded and are distributed along at least one of two adjacent sides (e.g., a left side and an upper side) of the coding block. The plurality of reference pixels of the coding block may also be referred to as first reference pixels that are close to the coding block. A pixel close to the coding block may refer to a distance between the pixel and a side of the coding block that is closest to the pixel is less than a threshold. The distance between the pixel and the side of the coding block may be defined by a number or count of pixels between the pixel and the side of the coding block. The threshold may be equal to 1, or 2, or 3, or 4, etc. For example, the plurality of first reference pixels may be on one or more reference lines of the coding block. The one or more reference lines may be located one by one along two adjacent sides (e.g., a left side and an upper side) of the coding block and each of the one or more reference lines may include one or more reference pixels (i.e., first reference pixels). A count of the one or more reference pixels on each of the one or more reference lines may be a default setting of the image coding system 100 or may be adjustable (e.g., adjusted according to actual needs) under different situations. For example, a reference line that is closest to the upper side and the left side of the coding block (also referred to as a first reference line or reference line with index 0) may include all or a portion of reference pixels that are closest to the upper side and the left side of the coding block. As another example, a reference line that is closest to the first reference line (also referred to as a second reference line or reference line with index 1) may include all or a portion of reference pixels that are closest to the first reference line. Further, other reference lines may be determined similarly to the determination of the second reference line, and be referred to as a third reference line (or reference line with index 2), a fourth reference line (or reference line with index 3), or the like.

In some embodiments, a searching template corresponding to the coding block may include at least one of the coding block or a block associated with the coding block. The block may include at least a portion of the plurality of first reference pixels. In some embodiments, the one or more searching templates may include a searching template of a first type, one or more searching templates of a second type, one or more searching templates of a third type, etc.

The searching template of the first type may correspond to that a searching template includes only the coding block. For the coding block with a size of 4×4, the size of the searching template may be 4×4. For the coding block with a size of 16×8, the size of the searching template may be 16×8.

A searching template of the second type may include an image block that includes the coding block and all or a portion of the plurality of first reference pixels of the coding block. The shape and the size of the searching template of the second type may be the same as the size and the shape of a region including the coding block and all or a portion of the plurality of first reference pixels of the coding block.

Figure 11:
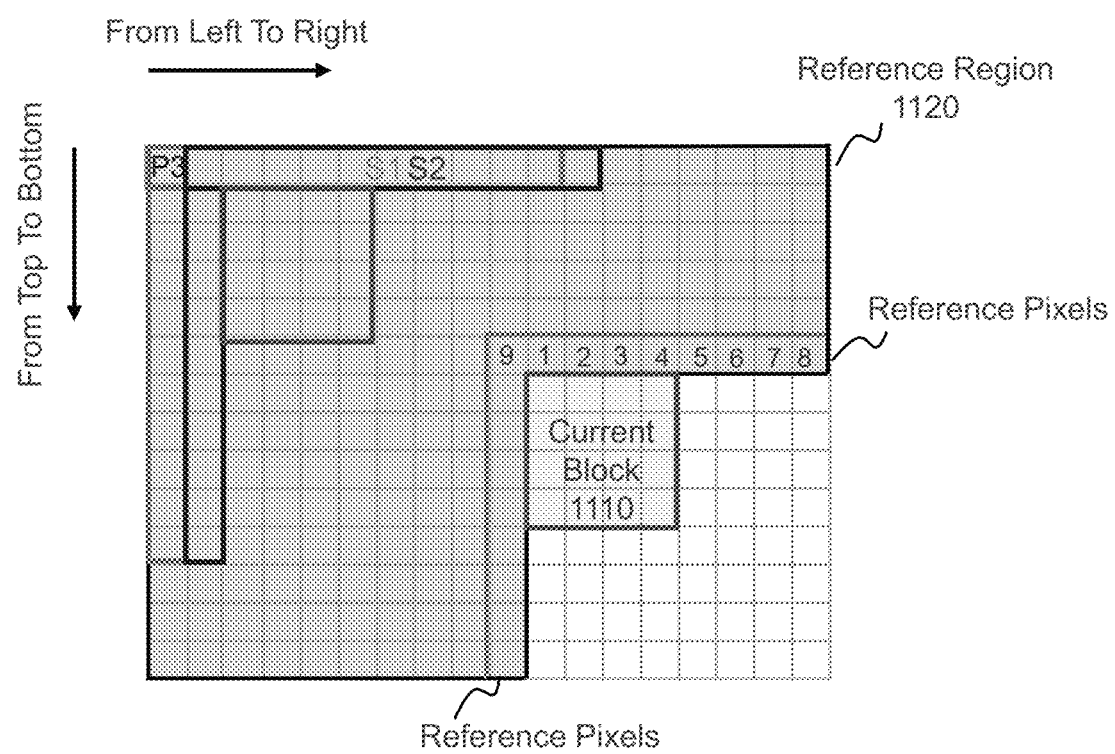
FIG. 11 is a schematic diagram illustrating an exemplary searching template according to some embodiments of the present disclosure.

In some embodiments, the searching template of the second type may include a first searching template of the second type and a second searching template of the second type. The first searching template of the second type may be different from the second searching template of the second type in the shape and/or size if the first searching template of the second type and the second searching template of the second type are determined based on different first reference pixels. For example, the shape of the first searching template of the second type may be rectangle and the shape of the first searching template of the second type may be non-rectangle. As a further example, a count (or number) of reference lines of the coding block which is denoted as M (being equal to or greater than 1) may be equal to 1 and the coding block may be of a size of 4×4. The searching template of the second type may be determined based on the coding block and one or more first reference pixels on the first reference line (e.g., one or more reference pixels on a column in the image that is closest to the left side of the coding block and/or one or more reference pixels on a row in the image that is closest to the upper side of the coding block). If the first reference pixels on the first reference line for determining the searching template of the second type include 4 reference pixels (e.g., pixels 1-4 as shown in FIG. 11) that are right above the upper side of the coding block, the shape of the searching template of the second type may be rectangle. If the first reference pixels on the first reference line for determining the searching template of the second type include 8 reference pixels that are above of the upper side of the coding block (e.g., 4 reference pixels (e.g., pixels 1-4 as shown in FIG. 11) right above the upper side and 4 reference pixels (e.g., pixels 5-8 as shown in FIG. 11) at upper-right of the upper side), 9 reference pixels that are above of the upper side of the coding block (e.g., 4 reference pixels (e.g., pixels 1-4 as shown in FIG. 11) right above the upper side, 4 reference pixels (e.g., pixels 5-8 as shown in FIG. 11) at the upper-right of the upper side, and 1 reference pixels (e.g., pixel 9 as shown in FIG. 11) at the upper-left of the upper side), or the like, the shape of the searching template of the second type may be non-rectangle. For M=2, the searching template of the second type may be determined based on the coding block and one or more first reference pixels on the first reference line and/or the second reference line (e.g., reference pixels on two left columns closest to the left side of the coding block and two upper rows closest to the upper side of the coding block).

A searching template of a third type may be determined based only on all or a portion of the plurality of first reference pixels of the coding block. For example, the searching template of the third type may be an image block in the image that includes all or a portion of the plurality of first reference pixels of the coding block. The size and the shape of the searching template of the third type may be the same as the size and the shape of a region including of the all or a portion of the plurality of first reference pixels of the coding block. The all or a portion of the plurality of first reference pixels of the coding block in the searching template of the third type may be the same as or similar to that in the searching template of the second type. In some embodiments, the searching template of the third type may include a first searching template of the third type and a second searching template of the third type. The first searching template of the third type may be different from the second searching template of the third type in the shape and/or size if the first searching template of the third type and the second searching template of the third type are determined based on different first reference pixels. For example, if the counts of first reference pixels in the first searching template of the third type and the second searching template of the third type are different, the sizes and the shapes of the first searching template of the third type and the second searching template of the third type may be different. More descriptions regarding the three searching template types may be found elsewhere in the present disclosure (e.g., FIGS. 9-11 and the descriptions thereof).

In some embodiments, the processing device 112 may obtain one or more block-machining prediction modes from a storage device of the image coding system 100 (e.g., the storage device 150), each of which corresponds to a searching template. The processing device 112 may obtain the one or more searching templates corresponding to the coding block based on the one or more block-machining prediction modes and the coding block.

In some embodiments, each of the one or more block-matching prediction modes may be denoted with a specific sequence number (or index) such that the one or more block-matching prediction modes may be distinguished based on the sequence numbers. For example, the specific sequence number may be associated with a count (number) of the one or more block-matching prediction modes, i.e., the specific sequence number may be associated with a count (number) of the one or more searching templates of various types. If the count (or number) of the one or more searching templates is w, the one or more block-matching prediction modes corresponding to the one or more searching templates may be respectively denoted with sequence numbers of N+1, N+2, . . . , N+w, wherein N (e.g., 67) refers to a count (number) of traditional prediction modes (e.g., a planar prediction mode, a DC prediction mode, and one or more angular prediction modes). As another example, the specific sequence number may be individually for searching templates of different types. For a block-matching prediction mode corresponding to the searching template of the first type, the block-matching prediction mode may be denoted with a sequence number of N+1, wherein N refers to a count (number) of traditional prediction modes (e.g., a planar prediction mode, a DC prediction mode, and one or more angular prediction modes). For block-matching prediction modes corresponding to the searching template of the second type, the block-matching prediction modes may be respectively denoted with sequence numbers of N+1, N+2, . . . , N+n, wherein N refers to a count (number) of traditional prediction modes (e.g., a planar prediction mode, a DC prediction mode, and one or more angular prediction modes) and n may be the same as or different from M. n may indicate a count (or number) of searching templates of the second type. For instance, if n is the same as M and M=2, a block matching mode corresponding to the searching template of the second type may be denoted with a sequence number of N+2. For a block-matching prediction mode corresponding to the searching template of the third type, the block-matching prediction mode may be denoted with a sequence number of N+p, wherein N refers to a count (number) of traditional prediction modes (e.g., a planar prediction mode, a DC prediction mode, and one or more angular prediction modes) and p is greater than or equal to 1 which reflects a count (or number) of searching templates of the third type. For instance, if the count of searching templates of the third type denoted as v, the block-matching prediction modes corresponding to the searching template of the third type may be respectively denoted with sequence numbers of N+1, N+2, . . . , N+v).

In 830, for each of the one or more searching templates, the processing device 112 (e.g., the reference block determination module 730) may determine, based on the searching template, one or more candidate blocks from a reference region. The reference region may include a plurality of reference pixels that are encoded in the image or a reference image (e.g., a video frame) that has been already encoded before the image and is in the same video as the image. The plurality of reference pixels may include the first plurality of reference pixels.

It should be noted that in the reference region, a specific image block may be the same as or similar to coding block, thus a difference between the specific image block in the reference region and the coding block may be minimum among differences between other image blocks in the reference region and the coding block. However, the specific image block may not be adjacent to the coding block such that it is needed to search the specific image block in the reference region according to the searching template to determine the specific image block that is similar to or same as the coding block.

A candidate block may refer to an image block in the reference region. The size (and shape) of each of the one or more candidate blocks may be the same as a size (and shape) of the searching template. The processing device 112 may search the one or more candidate blocks in the reference region according to the searching template (e.g., the size, the shape, the luminance, and/or the chrominance of the searching template) using a searching strategy. The searching strategy may include a fast searching strategy a global searching strategy, etc. Using the fast searching strategy, the processing device 112 may search the one or more candidate blocks using a sampling technique. A start point for sampling may be determined to be anywhere in the reference region. The sampling technique may include using a two dimensional logarithmic search algorithm, a three step search algorithm, a test zone (TZ) search algorithm, a hybrid search algorithm, or the like, or any combination thereof. Using a global searching strategy, the processing device 112 may determine the one or more candidate blocks by traversing the reference region using the searching template. In such situations, a start point may also be determined to be anywhere in the reference region, and a searching step size may include at least one pixel. More descriptions regarding determining the one or more candidate blocks may be found elsewhere in the present disclosure (e.g., FIGS. 9-11 and the descriptions thereof).

In 840, for each of the one or more searching templates, the processing device 112 (e.g., the reference block determination module 730) may determine a reference block corresponding to the searching template from the one or more candidate blocks. The reference block corresponding to the searching template may refer to that the reference block matches the searching template. As used herein, the reference block matching the searching template (also referred to as an optimal block) may refer to that a similarity degree between the reference block and the searching template is maximum among similarity degrees each of which is between the searching template and one of the one or more candidate blocks or the similarity degree between the reference block and the searching template exceeds a threshold (e.g., 0.9, 08., etc.).

In some embodiments, for each of the one or more searching templates, the processing device 112 may determine one or more matching degrees each of which is between the searching template and one of the one or more candidate blocks. A matching degree between the searching template and a candidate block may represent a similarity degree between the searching template and the candidate block. The greater the matching degree between the searching template and a candidate block, the greater the similarity degree between the searching template and the candidate block may be.

In some embodiments, a matching degree between the searching template and a candidate block may be related to a deviation between the searching template and the candidate block. The greater the deviation between the searching template and the candidate block, the lower the matching degree between the searching template and the candidate block may be. The deviation between the searching template and the candidate block may be reflected by a value of a sum of absolute differences (also referred to as a SAD value) between pixels values in the searching template and pixel values in the candidate block, a value of a mean squared error (also referred to as a MSE value) between pixels values in the searching template and pixel values in the candidate block, a value of a mean absolute deviation (also referred to as a MAD value) between pixels values in the searching template and pixel values in the candidate blocks, a value of a count (number) of threshold differences (also referred to as a NTD value) between pixels values in the searching template and pixel values in the candidate block, or the like, or any combination thereof. Merely by way of example, the SAD value between pixels values in the searching template and pixel values in the candidate block may be determined according to Equation (2) without multiplication or division, which is convenient for hardware implementation:

$$SAD_k = \Sigma_k |s(x_1,y_1) - c(x_2,y_2)|, \quad (2)$$

wherein k refers to a kth candidate block, $s(x_1, y_1)$ refers to a pixel value of a pixel with a coordinate $(x_1, y_1)$ in the kth candidate block, $c(x_2, y_2)$ refers to a pixel value of a pixel with a coordinate $(x_2, y_2)$ in the searching template, and a relative location of the pixel with the coordinate $(x_1, y_1)$ with respect to the kth candidate block may be the same as a relative location of the pixel with the coordinate $(x_2, y_2)$ with respect to the searching template. As used herein, a pixel value of a pixel may include a luminance and/or chrominance value of the pixel.

In some embodiments, for each of the one or more searching templates, the processing device 112 may determine, based on the one or more matching degrees, the reference block from the one or more candidate blocks. For example, the processing device 112 may determine a minimum value from the one or more deviations (e.g., from one or more SAD values) (or determine a maximum value among matching degrees) and designate a candidate block corresponding to the minimum value of deviations (or maximum value of matching degrees) as the reference block. As another example, the processing device 112 may determine one or more candidate blocks that the matching degree exceeds a threshold as the reference block.

In 850, the processing device 112 (e.g., the prediction block determination module 740) may determine, based at least in part on one or more reference blocks, a prediction block of the coding block. As used herein, "prediction block of the coding block" may be used interchangeably with "prediction block corresponding to the coding block".

In some embodiments, the processing device 112 may determine one or more first candidate prediction blocks of the coding block using one or more prediction modes (i.e., first prediction modes). The one or more prediction modes may include a planar mode, a DC mode, one or more angular prediction modes as described in FIG. 4.

The processing device 112 may determine, based on the one or more reference blocks, one or more second candidate prediction blocks of the coding block. In some embodiments, for each of the one or more reference blocks, the processing device 112 may determine a second candidate prediction block of the coding block based on a type of a searching template corresponding to the reference block. For example, if the searching template corresponding to the reference block is of the first type, the processing device 112 may designate the reference block as a second candidate prediction block of the coding block. As another example, if the searching template corresponding to the reference block is of the second type, the processing device 112 may designate a specific image block in the reference block as a second candidate prediction block of the coding block, wherein a relative location of the specific image block in the reference block may be the same as a relative location of the coding block in the searching template. As still another example, if the searching template corresponding to the reference block is of the third type, the processing device 112 may designate a specific image block in the reference region as a second candidate prediction block of the coding block, wherein a relative location of the specific image block with respect to the reference block may be the same as a relative location of the coding block with respect to the searching template. In some embodiments, the processing device 112 may determine multiple intermediate predication blocks based on the one or more reference blocks. The processing device 112 may average the multiple intermediate predication blocks to determine a second candidate prediction block.

Further, the processing device 112 may determine the prediction block (i.e., a target prediction block) of the coding block based on the one or more first prediction blocks and the one or more second prediction blocks. For example, the processing device 112 may determine one or more first Rdcosts each of which corresponds to one of the one or more first candidate prediction blocks. The processing device 112 may determine one or more second Rdcosts each of which corresponds to one of the one or more second candidate prediction blocks. The one or more first Rdcosts and the one or more second Rdcosts may be determined similarly with the Rdcost determined according to Equation (1) as described in FIG. 4, and not repeated herein. The processing device 112 may determine the target prediction block of the coding block based on the one or more first rate-distortion costs and the one or more second rate-distortion costs. Merely by way of example, the processing device 112 may designate a specific second candidate prediction block among the one or more second candidate prediction blocks as the target prediction block of the coding block in response to a determination that a second Rdcost corresponding to the specific second candidate prediction block is minimum among the one or more second Rdcosts and the one or more first RDcosts. The processing device 112 may designate a prediction mode used to determine the specific second candidate prediction block as an optimal prediction mode for the coding block. Alternatively, the processing device 112 may designate a specific first candidate prediction block among the one or more first candidate prediction blocks as the prediction block of the coding block in response to a determination that a first Rdcost corresponding to the specific first candidate prediction block is minimum among the one or more first rate-distortion costs and the one or more second RDcosts. The processing device 112 may designate a prediction mode used to determine the specific first candidate prediction block as an optima prediction mode for the coding block.

In some embodiments, the processing device 112 may decode the coding block based on the optimal prediction mode for the coding block. It is assumed that the optimal prediction mode is a specific block-matching mode. For the specific block-matching mode corresponding to a searching template of the first type or the second type, a searching template corresponding the specific block-matching mode may include the coding block and a motion vector from the coding block to the prediction block corresponding to the coding block (also referred to as a motion vector corresponding to the coding block) may be needed to be encoded in a bitstream for transmission. For example, the processing device 112 may determine a motion vector corresponding to a specific image block that is adjacent to the coding block as a prediction motion vector corresponding to the coding block, wherein the specific image block is encoded before the coding block and an optimal prediction mode for the specific image block is a block-matching prediction mode. The processing device 112 may encode the coding block into a bitstream by encoding a motion vector residual that is determined based on the motion vector corresponding to the coding block and the prediction motion vector corresponding to the coding block. A decoder (e.g., the user device 140) may determine the motion vector corresponding to the coding block based on the motion vector residual and the prediction motion vector corresponding to the coding block. The decoder may determine the prediction block corresponding to the coding block based on the motion vector corresponding to the coding block for decoding the coding block. As another example, the processing device 112 may determine an average value of a plurality of motion vectors corresponding to a plurality of image blocks that are adjacent to the coding block as a prediction motion vector corresponding to the coding block, wherein the plurality of image blocks are encoded before the coding block and an optimal prediction mode for each of the plurality of image blocks is a block-matching prediction mode. The processing device 112 may encode the coding block into a bitstream by encoding a motion vector residual that is determined based on the motion vector corresponding to the coding block and the prediction motion vector corresponding to the coding block. A decoder (e.g., the user device 140) may determine the motion vector corresponding to the coding block based on the motion vector residual and the prediction motion vector corresponding to the coding block. The decoder may determine the prediction block corresponding to the coding block based on the motion vector corresponding to the coding block for decoding the coding block.

For the specific block-matching mode corresponding to a searching template type of the third type, a searching template corresponding to the specific block-matching mode may include only reference pixels without the coding block. In some embodiments, a syntax element used for controlling whether a motion vector corresponding to the coding block is transmitted may be added in a data set such as a picture parameter set (PPS), a sequence parameter set, or a slice header information. If the motion vector corresponding to the coding block is transmitted, the decoder may determine the prediction block corresponding to the coding block based on the motion vector corresponding to the coding block for decoding the coding block. Alternatively, if the motion vector corresponding to the coding block is not transmitted, the decoder may determine the prediction block corresponding to the coding block based on a block-matching mode for decoding the coding block. For example, the processing device 112 may encode the coding block into a bitstream by encoding a motion vector or a motion vector residual corresponding to the coding block. A decoder may determine the prediction block corresponding to the coding block by decoding the motion vector or the motion vector residual corresponding to the coding block in the bitstream. As another example, an encoder (e.g., the processing device 112) may not encode the motion vector corresponding to the coding block. The decoder may determine the prediction block of the coding block based on a block-matching prediction mode and a searching strategy that is the same as or similar to that are used for determining the prediction block of the coding block in the encoding process.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, one or more operations may be added and/or omitted in the process 800. For example, a storing operation may be added elsewhere in the process 800. In the storing operation, the processing device 112 may store information and/or data (e.g., the prediction block corresponding to the coding block, the optimal prediction mode for the coding block) associated with the image coding in a storage device (e.g., the storage device 150) disclosed elsewhere in the present disclosure. As another example, operations 830 and 840 may be integrated into one operation.

Figure 9:
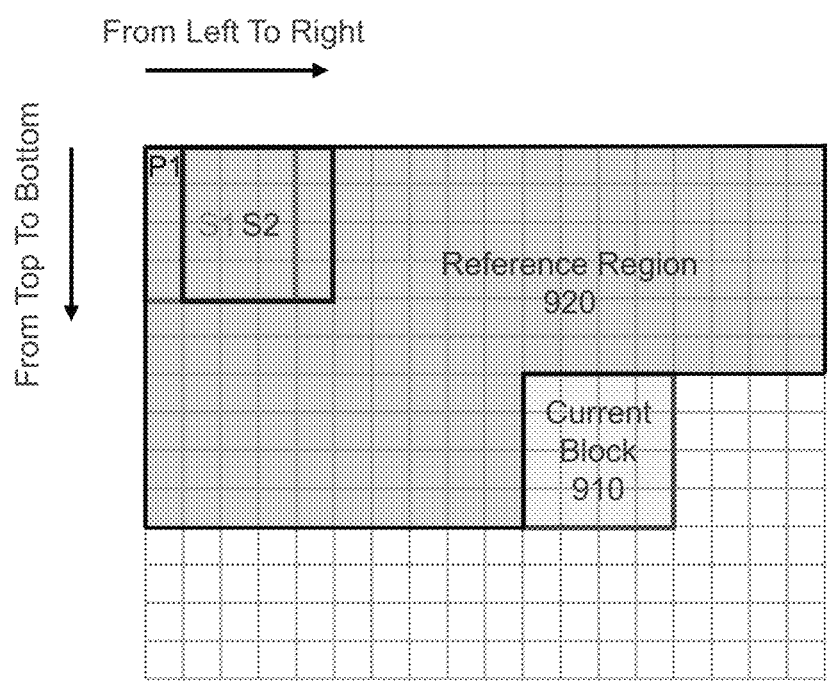
FIG. 9 is a schematic diagram illustrating an exemplary searching template according to some embodiments of the present disclosure.

FIG. 9 is a schematic diagram illustrating an exemplary searching template according to some embodiments of the present disclosure. As described in connection with FIG. 8, a searching template shown in FIG. 9 is the searching template of the first type that includes only a coding block 910 with a size of 4×4. As shown in FIG. 9, the processing device 112 may use a global searching strategy for determining one or more candidate blocks each of which has the same size as the coding block 910. For example, the processing device 112 may perform a searching operation using the searching template in a reference region 920 that includes encoded pixels (i.e., reference pixels) distributed beside an upper side and a left side of the coding block 910. A searching step size of the searching operation may be one pixel, a start point may be a pixel P1 at the top-left of the coding block 910, and a search direction may be from the left to right and then from the top to bottom that arrows points in FIG. 9. The processing device 112 may determine the one or more candidate blocks based on the searching operation. For example, an image block S1 with a size of 4×4 may be a first candidate block that is determined based on the searching operation, and an image block S2 with a size of 4×4 may be a second candidate block that is determined based on the searching operation.

Figure 10:
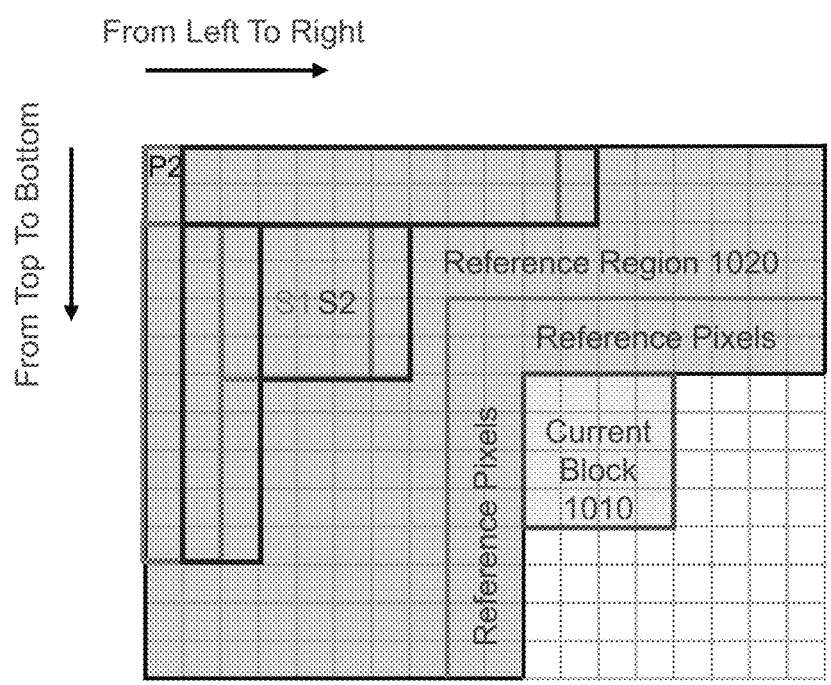
FIG. 10 is a schematic diagram illustrating an exemplary searching template according to some embodiments of the present disclosure.

FIG. 10 is a schematic diagram illustrating an exemplary searching template according to some embodiments of the present disclosure. As described in connection with FIG. 8, a searching template as shown in FIG. 10 is the searching template of the second type that includes a coding block 1010 with a size of 4×4 and reference pixels on two reference lines of the coding block 1010. For example, the searching template may include the coding block 1010, 16 reference pixels within two columns on a left side of the coding block 1010, and 16 reference pixels within two rows on an upper side of the coding block 1010. As shown in FIG. 10, the processing device 112 may use a global searching strategy for determining one or more candidate blocks each of which has the same size and shape as the searching template. For example, the processing device 112 may perform a searching operation using the searching template in a reference region 1020 that includes encoded pixels (i.e., reference pixels) distributed beside the upper side and the left side of the coding block 1010. A searching step size of the searching operation may be one pixel, a start point P2 may be a pixel at the top-left of the coding block 910, and a search direction may be from the left to right and then from the top to bottom that arrows points in FIG. 10. The processing device 112 may determine the one or more candidate blocks based on the searching operation. For example, an image block S1 may be a first candidate block that is determined based on the searching operation, and an image block S2 may be a second candidate block that is determined based on the searching operation.

FIG. 11 is a schematic diagram illustrating an exemplary searching template according to some embodiments of the present disclosure. As described in connection with FIG. 8, a searching template shown in FIG. 11 is a searching template of the third type that includes only reference pixels on one reference line of a coding block 1110 with a size of 4×4. For example, the searching template may include 8 reference pixels within a column adjacent to a left side of the coding block 1110 and 8 reference pixels within a row adjacent to an upper side of the coding block 1110. As shown in FIG. 11, the processing device 112 may use a global searching strategy for determining one or more candidate blocks each of which has the same size as the searching template. For example, the processing device 112 may perform a searching operation using the searching template in a reference region 1120 that includes encoded pixels (i.e., reference pixels) distributed beside the upper side and the left side of the coding block 1110. A searching step size of the searching operation may be one pixel, a start point P3 may be a pixel at the top-left of the coding block 1110, and a search direction may be from the left to right and then from the top to bottom that arrows points in FIG. 10. The processing device 112 may determine the one or more candidate blocks based on the searching operation. For example, an image block S1 may be a first candidate block that is determined based on the searching operation, and an image block S2 may be a second candidate block that is determined based on the searching operation.

Figure 12:
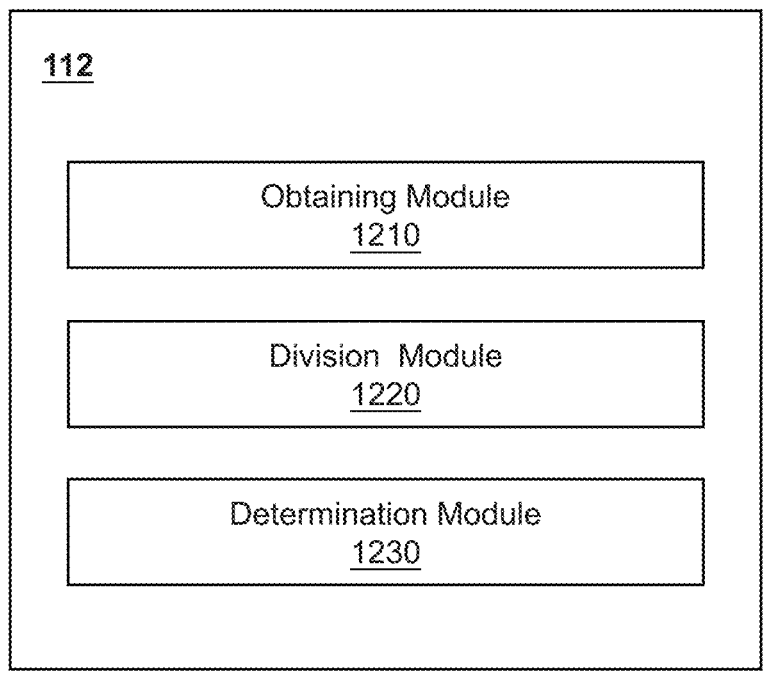
FIG. 12 is a block diagram illustrating an exemplary processing device according to some embodiments of the present disclosure.

FIG. 12 is a block diagram illustrating an exemplary processing device according to some embodiments of the present disclosure. The processing device 112 may include an obtaining module 1210, a division module 1220, and a determination module 1230.

The obtaining module 1210 may be configured to obtain data/information from one or more components of the image coding system 100. For example, the obtaining module 1210 may obtain a coding block in an image from one or more components of the image coding system 100 (e.g., the storage device 150, the acquisition device 130). The coding block may be a non-square block (e.g., a rectangle block). The coding block may include a first side (or a longer side) and a second side (or a shorter side) that is shorter than the first side. As another example, the obtaining module 710 may obtain one or more prediction modes (e.g., a planar prediction mode, a DC prediction mode, one or more angular prediction modes, or one or more block-matching prediction modes) from one or more components of the image coding system 100 (e.g., the storage device 150, the acquisition device 130).

The division module 1220 may be configured to divide the coding block into at least two sub-blocks (e.g., a first sub-block and a second block). In some embodiments, the division module 1220 may determine a division line that is parallel to the second side and pass through a division point that is on the first side. The division module 1220 may divide the coding block into the first sub-block and the second sub-block based on the division line. For example, the division module 1220 may determine a position on the first side where a pixel is located as the division point. As another example, the division module 1220 may determine the division point based on a wide angular prediction mode that may be used to predict the coding block. More descriptions regarding dividing the coding block into the first sub-block and the second sub-block may be found elsewhere in the present disclosure (e.g., operation 1330 in FIG. 13, FIGS. 14-17 and the descriptions thereof).

The determination module 1230 may be configured to determine at least one wide angular prediction modes based on the coding block. For example, the determination module 1230 may determine a width and height ratio of the coding block. The determination module 1230 may determine the at least one angular prediction modes based on the width and height ratio according to a relationship of the width and height ratio, one or more conventional angular prediction modes, and one or more wide angular prediction modes as illustrated in Table 1. More descriptions regarding determining the at least one wide angular prediction modes may be found elsewhere in the present disclosure (e.g., operation 1320 in FIG. 13 and the description thereof).

In some embodiments, the determination module 1230 may determine a prediction block (i.e., a target prediction block) of the coding block based at least in part on the first sub-block, the second sub-block, and the at least one wide angular prediction mode. For example, for each of the at least one wide angular prediction mode, the determination module 1230 may determine a first prediction sub-block of the first sub-block using a conventional angular prediction mode corresponding to the wide angular prediction mode, and determine a second prediction sub-block of the second sub-block using the wide angular prediction mode or an angular prediction mode opposite to the conventional angular prediction mode. The determination module 1230 may determine a second candidate prediction block of the coding block based on the first prediction sub-block and the second prediction sub-block for each of the at least one wide angular prediction mode. The determination module 1230 may determine one or more first candidate prediction blocks of the coding block using one or more prediction modes (e.g., a planar prediction mode, a DC prediction mode, and one or more block-matching prediction modes). Further, the determination module 1230 may determine the target prediction block based on the one or more first candidate prediction blocks and the second candidate prediction block for each of the at least one wide angular prediction mode. More descriptions regarding determining the target prediction block of the coding block may be found elsewhere in the present disclosure (e.g., operation 1340 in FIG. 13 and the description thereof).

The modules in the processing device 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units.

It should be noted that the above descriptions of the processing device 112 are merely provided for the purposes of illustration, and not intended to limit the scope of the present disclosure. For persons having ordinary skills in the art, various modifications and changes in the forms and details of the application of the above method and system may occur without departing from the principles of the present disclosure. However, those variations and modifications also fall within the scope of the present disclosure. In some embodiments, two or more of the modules (or units) may be combined into a single module (or unit), and any one of the modules may be divided into two or more units. For example, the determination module 1230 may be divide into two units, one of which may determine the at least one wide angular prediction modes and another of which may determine the prediction block corresponding to the coding block. In some embodiments, one or more optional modules may be added in the processing device 112. For example, the processing device 112 may include a transmission module configured to transmit signals (e.g., electrical signals, electromagnetic signals) to one or more components (e.g., the acquisition device 130, the user device 140, the storage device 150) of the image coding system 100. As a further example, the processing device 112 may include a storage module (not shown) used to store information and/or data (e.g., the one or more prediction modes, the prediction block corresponding to the coding block) associated with the image coding.

In some embodiments, the processing devices 112 in FIGS. 7 and 12 may be respectively implemented on a processing unit (e.g., the processor 210 illustrated in FIG. 2 or the CPU 340 as illustrated in FIG. 3). Merely by way of example, the processing devices 112 in FIG. 7 may be implemented on a CPU 340 of a terminal device, and the processing device 112 in FIG. 12 may be implemented on a computing device 200. Alternatively, the processing devices 112 in FIGS. 7 and 12 may be implemented on a same computing device 200 or a same CPU 340. In some embodiments, the processing devices 112 in FIGS. 7 and 12 may share two or more of the modules, and any one of the modules may be divided into two or more units. For example, the processing device 112 in FIG. 7 and the processing device 112 in FIG. 12 may share a same obtaining module (i.e., the obtaining module 710 and the obtaining module 1210 may be a same obtaining module). In some embodiments, the processing devices 112 in FIGS. 7 and 12 may be integrated into one processing device 120.

Figure 13:
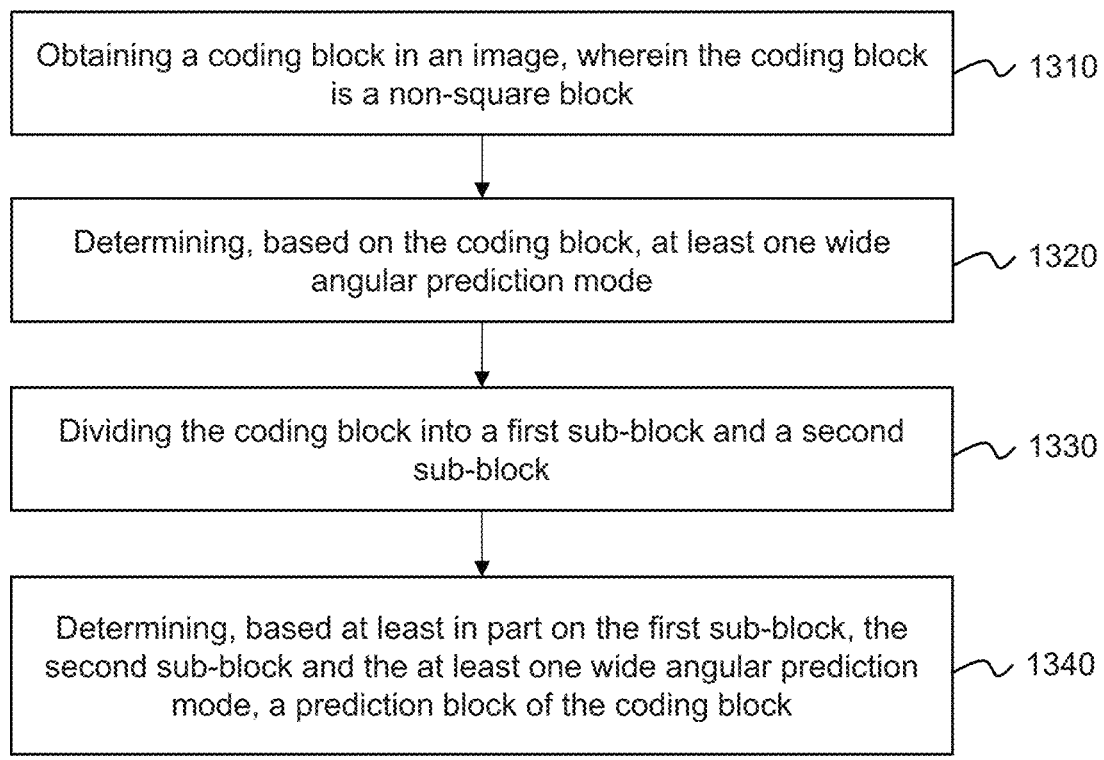
FIG. 13 is a schematic diagram illustrating an exemplary process for prediction according to some embodiments of the present disclosure.

FIG. 13 is a schematic diagram illustrating an exemplary process for prediction according to some embodiments of the present disclosure. In some embodiments, the process 1300 may be implemented as a set of instructions (e.g., an application) stored in a storage device (e.g., the storage device 150, the ROM 230 or RAM 240). The processing device 112 (e.g., the processor 220, the CPU 340, and/or the modules in FIG. 7) may execute the set of instructions, and when executing the instructions, the processor 220, the CPU 340, and/or the modules may be configured to perform the process 1300. The operations of the illustrated process presented below are intended to be illustrative. In some embodiments, the process 1300 may be accomplished with one or more additional operations not described and/or without one or more of the operations herein discussed. Additionally, the order in which the operations of the process as illustrated in FIG. 13 and described below is not intended to be limiting.

In 1310, the processing device 112 (e.g., the obtaining module 1210) may obtain a coding block in an image.

In some embodiments, the coding block may be a non-square block (e.g., a rectangle block). For purposes of description, the coding block may include a first side (also referred to as longer side) and a second side (also referred to as shorter side) that is shorter than the first side. The first side and the second side may be two adjacent sides of the coding block. The coding block may include a width and a height. As used herein, the length of a side of the coding block along a horizontal direction of the coding block may be designated as the width of the coding block. The length of a side of the coding block along a vertical direction of the coding block may be designated as the height of the coding block. For example, if the width of the coding block is less than the height, the length of the second side of the coding block may be equal to the width. If the width of the coding block is greater than the height, the length of the first side of the coding block may be equal to the height.

Operation 1310 may be the same as or similar to operation 410 as described in FIG. 4, and not repeated herein.

In 1320, the processing device 112 (e.g., the determination module 1230) may determine, based on the coding block, at least one wide angular prediction mode. In some embodiments, prediction modes of the coding block may include a planar prediction mode, a DC prediction mode, one or more angular prediction modes (e.g., angular modes 2-66), one or more block-matching prediction modes (as descried in FIG. 8), or the like, or any combination thereof. In order to further improve the compression rate of video encoding, reference pixels adjacent to the first side (or the longer side) of the coding block may have stronger correlation than reference pixels adjacent to the second side (or the shorter side) of the rectangle coding block. More reference pixels adjacent to the first side may be selected by adding wide angular prediction modes, which may improve accuracy of prediction values of the rectangle coding block.

In response to determining that the length of the first side is different from the length of the second side, the processing device 112 may replace a portion of the angular prediction modes (e.g., angular modes 2-66) using the at least one wide angular prediction mode. In some embodiments, the processing device 112 may determine at least one conventional angular prediction modes associate with the coding block. The processing device 112 may determine the at least one wide angular prediction mode based on a ratio of the width and the height (also referred to as a width and height ratio) of the coding block or a ratio of the height to the width (also referred to as a height and width ratio) of the coding block and the at least one conventional angular prediction modes. The at least one wide angular prediction modes may replace the at least one angular conventional prediction modes. The greater the width and height ratio or the height and width ratio is, the more conventional angular prediction modes of the at least one conventional angular prediction modes may be replaced by the at least one wide angular prediction modes. In some embodiments, a relationship between the portion of the one or more conventional angular modes being replaced by the at least one wide angular prediction modes and the ratio of the width to the height (also referred to as a width and height ratio) may be determined and stored in a storage device (e.g., the storage device 150) in the form of a table, a function, etc.

For example, Table 1 illustrates a relationship of the width and height ratio, wide angular prediction modes, and conventional angular prediction modes. The relationship as shown in Table 1 provides multiple width and height ratios and which portion in the conventional angular prediction modes needing to be replaced by which portion of the wide angular prediction modes corresponding to each of the multiple width and height ratios. When the width and height ratio is 32, angular modes 67~81 may replace angular modes 2-16 in turn (e.g., angular mode 67 replacing angular mode 2, angular 68 replacing angular mode 3). In some embodiments, if a specific conventional angular prediction mode is replaced by a specific wide angular prediction mode, the specific conventional angular prediction mode may also be referred to as a conventional angular prediction mode corresponding to the specific wide angular prediction mode.

TABLE 1

Relationship of the width and height ratio, wide angular prediction modes, and conventional angular prediction modes

| Width/Height | Replaced Conventional Angular Prediction Modes | Added Wide Angular Prediction Modes |
|---|---|---|
| 1 | None | None |
| 2 | Angular Modes 2~7 | Angular Modes 67~72 |
| 4 | Angular Modes 2~11 | Angular Modes 67~76 |
| 8 | Angular Modes 2~13 | Angular Modes 67~78 |
| 16 | Angular Modes 2~15 | Angular Modes 67~80 |
| 32 | Angular Modes 2~16 | Angular Modes 67~81 |
| 1/2 | Angular Modes 61~66 | Angular Modes −4~1 |
| 1/4 | Angular Modes 57~66 | Angular Modes −8~1 |
| 1/8 | Angular Modes 55~66 | Angular Modes −10~1 |
| 1/16 | Angular Modes 53~66 | Angular Modes −12~1 |
| 1/32 | Angular Modes 52~66 | Angular Modes −13~1 |

In some embodiments, the processing device 112 may determine a width and height ratio of the coding block. The processing device 112 may determine the at least one wide angular prediction mode based on the width and height ratio of the coding block according to the relationship as shown in Table 1.

In 1330, the processing device 112 (e.g., the division module 1220) may divide the coding block into a first sub-block and a second sub-block.

In some embodiments, in response to determining that a prediction mode for predicting the coding block is one of the at least one wide angular prediction mode, the processing device 112 may divide the coding block into the first sub-block and the second sub-block.

In some embodiments, the processing device 112 may determine a division line that is parallel to the second side and pass through a division point that is on the first side. The processing device 112 may divide the coding block into the first sub-block and the second sub-block based on the division line. Two adjacent sides of the first sub-block may be adjacent to a first portion of a plurality of reference pixels of the coding block, while only one side of the second sub-block may be adjacent to a second portion of the plurality of reference pixels of the coding block. For example, as shown in FIGS. 14A and 14B, FIGS. 14A and 14B show exemplary division directions of a coding block according to some embodiments of the present disclosure. As shown in FIG. 14A, the width of the coding block 1401 is longer than the height. The coding block 1401 may be divided along the vertical direction of the coding block 1401. The division line 1420 may be parallel to the vertical direction. Two adjacent sides of the first sub-block 1430 may be the shorter side (or the second side or a left side) of the coding block 1401 and a portion of the longer side (or the first side, or the upper side) of the coding block 1401, respectively. The first sub-block 1430 may be closer to reference pixels distributed along the shorter side (or the left side) of the coding block 1401 than the second sub-block 1420. As shown in FIG. 14B, the width of the coding block 1402 is shorter than the height. The coding block 1402 may be divided along the horizontal direction of the coding block 1402. The division line 1450 may be parallel to the horizontal direction. Two adjacent sides of the first sub-block 1460 may be the shorter side (or the second side, or the upper side) of the coding block 1402 and a portion of the longer side (or the first side, or the left side) of the coding block 1402, respectively. The first sub-block 1460 may be closer to reference pixels distributed along the shorter side (or the upper side) of the coding block 1402 than the second sub-block 1470.

In some embodiments, the processing device 112 may divide the coding block by determining the division point, for example, as shown in FIGS. 14A and 14B. For example, the processing device 112 may determine the division point at a position on the first side where a pixel located. As another example, the processing device 112 may determine the division point at a position between two adjacent pixels on the first side. As still another example, the processing device 112 may determine the division point on the first side based on a ratio of lengths of a first portion and a second portion of the first side that the division point may divide the first side into. The ratio of lengths of the first portion and the second portion may be 0.3, 0.4, 0.5, 0.6, 0.7, 0.8, etc. The first portion of the first side may be closer to the second side of the coding block than the second portion of the first side. The processing device 112 may determine a line passing through the division point and parallel to the second side as the division line such that the coding block is divided into the first sub-block and the second sub-block. More descriptions regarding dividing the coding block by determining the division point may be found elsewhere in the present disclosure (e.g., FIG. 16 and the description thereof).

In some embodiments, the processing device 112 may divide the coding block by determining the division point based on a conventional angular prediction mode that is replaced by one of the at least one wide angular prediction mode. For example, according to Table 1, if the width and height ratio of the coding block is 2, the conventional angular prediction mode with index 2 (i.e., angular mode 2) may be replaced by the wide angular prediction mode with index 67 (i.e., angular mode 67). If the width and height ratio of the coding block is 0.5, the conventional angular prediction mode with index 61 (i.e., angular mode 61) may be replaced by the wide angular prediction mode with index −4 (i.e., angular mode −4).

In some embodiments, the processing device 112 may determine the division point based on the prediction direction of the conventional angular prediction mode. For example, the processing device 112 may extend the prediction direction of the conventional angular prediction mode along the opposite direction of the prediction direction and the extended prediction direction may intersect with the first side. The processing device 2 may determine, based on the intersection point between the line and the first side, the division point. For example, the processing device 112 may designate the intersection point at the division point.

In some embodiments, the processing device 112 may determine a starting point on the second side of the coding block corresponding to the conventional angular prediction mode. As used herein, the starting point corresponding to a conventional angular prediction mode may refer to an intersection point between a prediction direction of the conventional angular prediction mode and the second side. For example, if the width of the coding block is longer than the height of the coding block, the second side may be along the vertical direction of the coding block, and the angular mode 2 may include an intersection point with the second side of the coding block at a lower endpoint of the second side. If the width of the coding block is shorter than the height of the coding block, the second side may be along the horizontal direction of the coding block, and the angular mode 66 may include an intersection point with the second side of the coding block at a right endpoint of the second side. The processing device 112 may determine a line from the starting point to the first side along a direction (e.g., the opposite direction of the prediction direction of the conventional angular prediction mode) and determine an intersection point of the line and the first side as the division point.

For example, as shown in FIGS. 15A and 15B, FIGS. 15A and 15B show exemplary division directions of a coding block according to some embodiments of the present disclosure. As shown in FIG. 15A, the width of the coding block 1501 is longer than the height of the coding block 1501. The angular mode 2 may be replaced by the angular mode 67. The angular mode 2 may include a prediction direction where dashed arrow points in FIG. 15A. The processing device 112 may determine a lower endpoint A1 of the second side (or the shorter side) as a starting point. The processing device 112 may determine an intersection point (denoted as J1) between the first side and an opposite direction of the prediction direction corresponding to the angular mode 2 that extends from the starting point. For example, the processing device 112 may extend the prediction direction corresponding to the angular mode 2 from the lower endpoint A1 (i.e., starting point) along the opposite direction of the prediction direction and the extended prediction direction may intersect with the first side, forming the intersection point J1. The processing device 112 may designate the intersection point J1 as the division point. The processing device 112 may determine a line passing through the division point and parallel to the second side as the division line 1520 such that the coding block is divided into the first sub-block 1530 and the second sub-block 1540. As shown in FIG. 15B, the width of the coding block 1502 is shorter than the height of the coding block 1502. The angular mode 66 may be replaced by the angular mode −4. The angular mode 66 may include a prediction direction where dashed arrow points in FIG. 15B. The processing device 112 may determine a right endpoint A2 of the second side (or the shorter side) as a starting point The processing device 112 may determine an intersection point (denoted as J2) between the first side and an opposite direction of a prediction direction corresponding to the angular mode 66 that extends from the starting point.

In some embodiments, the intersection point (e.g., point J1 and/or point J2) on the first side may be located between two adjacent pixels. The processing device 112 may determine the division point based on one of the two adjacent pixels. Further, the processing device 112 may determine one of the two adjacent pixels that is closest to the intersection point (e.g., point J1) as the division point. For example, for the coding block 1501 with the width greater than the height as shown in FIG. 15A, if the intersection point J1 on the first side is located between two adjacent pixels, the processing device 112 may determine one of the two adjacent pixels on the left or right of the intersection point J1 that is closest to the intersection point J1 as the division point. Alternatively, for the coding block 1502 with the width less than the height as shown in FIG. 15B, if the intersection point J2 is located between two adjacent pixels on the first side, the processing device 112 may determine one of the two adjacent pixels above or below the intersection point J2 that is closest to the intersection point J2 as the division point. More descriptions regarding dividing the coding block by determining the division point based on the wide angular prediction mode may be found elsewhere in the present disclosure (e.g., FIG. 17 and the description thereof).

In some embodiments, for the coding block with the width greater than the height (i.e., the first side of the coding block is an upper side or lower side of the coding block), a correlation between the first sub-block and reference pixels in a left side of the coding block may be stronger than a correlation between the second sub-block and the reference pixels in the left side of the coding block. Alternatively, for the coding block with the height greater than the width (i.e., the first side of the coding block is a left side or right side of the coding block), a correlation between the first sub-block and reference pixels in an upper side of the coding block may be stronger than a correlation between the second sub-block and the reference pixels in the upper side of the coding block.

In 1340, the processing device 112 (e.g., the determination module 1230) may determine, based at least in part on the first sub-block, the second sub-block, and the at least one wide angular prediction mode, a prediction block corresponding to the coding block.

In some embodiments, for each of the at least one wide angular prediction mode, the processing device 112 may determine a first prediction sub-block of the first sub-block using the conventional angular prediction mode corresponding to the wide angular prediction mode. The processing device 112 may determine a second prediction sub-block corresponding to the second sub-block using the wide angular prediction mode (e.g., angular mode 67) or an angular prediction mode a prediction direction of which is opposite to the prediction direction of the conventional angular prediction mode (also referred to as an angular prediction mode opposite to the conventional angular prediction mode). For example, for the coding block with the width greater than the height, angular mode 2 may be replaced by angular mode 67. The first sub-block may be predicted using angular mode 2 and the second sub-block may be predicted using angular mode 67 or an angular prediction mode opposite to angular mode 2 (i.e., angular mode 66). As another example, for the coding block with the width less than the height, angular mode 61 may be replaced by angular mode −4. The first sub-block may be predicted using angular mode 61 and the second sub-block may be predicted using angular mode −4 or an angular prediction mode opposite to angular mode 61 (i.e., angular mode −3). The processing device 112 may determine a second candidate prediction block of the coding block based on the first prediction sub-block and the second prediction sub-block for each of the at least one wide angular prediction mode.

In some embodiments, the processing device 112 may determine one or more first candidate prediction blocks corresponding to the coding block using one or more prediction modes. The one or more prediction modes may include a planar prediction mode, a DC prediction mode, one or more conventional angular prediction modes, one or more block-matching prediction modes each of which corresponds to a searching template, or the like, or any combination thereof. The processing device 112 may determine, based on the first prediction sub-block and the second prediction sub-block, a second candidate prediction block corresponding to the coding block, i.e., the processing device 112 may determine the second candidate prediction block corresponding to the coding block using a pair of prediction modes (e.g., the conventional angular prediction mode corresponding to the wide angular prediction mode and the wide angular prediction mode, or the conventional angular prediction mode corresponding to the wide angular prediction mode and the angular prediction mode opposite to the conventional angular prediction mode). The processing device 112 may determine the prediction block corresponding to the coding block based on the one or more first candidate prediction blocks and the second candidate prediction block for each of the at least one wide angular prediction modes, which may be the same as or similar to the description of operation 850 in FIG. 8 and not repeated herein. Further, the processing device 112 may determine a prediction mode corresponding to the prediction block as an optimal prediction mode for the coding block. The optimal prediction mode may include a single prediction mode or a pair of prediction modes corresponding to the first sub-block and the second sub-block.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, one or more operations may be added and/or omitted in the process 1300. For example, a storing operation may be added elsewhere in the process 1300. In the storing operation, the processing device 112 may store information and/or data (e.g., the prediction block corresponding to the coding block, the optimal prediction mode for the coding block) associated with the image coding in a storage device (e.g., the storage device 150) disclosed elsewhere in the present disclosure. As another example, operations 1320 and 1330 may be integrated into one operation.

Figure 16:
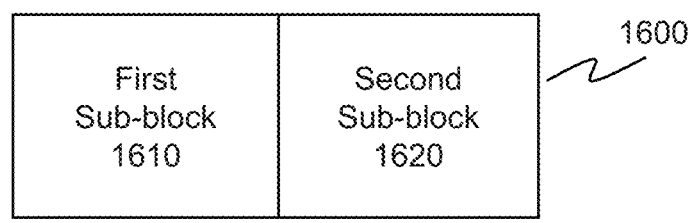
FIG. 16 is a schematic diagram illustrating an exemplary division line for dividing a coding block according to some embodiments of the present disclosure.

FIG. 16 is a schematic diagram illustrating an exemplary division line for dividing a coding block according to some embodiments of the present disclosure. As shown in FIG. 16, the coding block 1600 may include a size of 16×8. The processing device 112 may determine a middle point of a first side of the coding block 1600 as a division point. The processing device 112 may determine a division line 1630 based on the division point such that the coding block 1600 may be divided into a first sub-block 1610 and a second sub-block 1620. Each of the first sub-block 1610 and the second sub-block 1620 may be a square block with a size of 8×8. As described in connection with Table 1 in FIG. 13, conventional angular prediction modes for the coding block 1600 may be with sequence numbers within a range from 2 to 7 (denoted as M1), and corresponding wide angular prediction modes for the coding block 1600 may be with sequence numbers within a range from 67 to 72 (denoted as L1) when the width and height ratio of the coding block 1600 is equal to 2 according to Table 1. The processing device 112 may predict the first sub-block 1610 using the conventional angular prediction modes M1. The processing device 112 may predict the second sub-block 1620 using the wide angular prediction modes L1 or angular prediction modes opposite to conventional angular prediction modes M1 (i.e., wide angular prediction modes L1−1).

Figure 17:
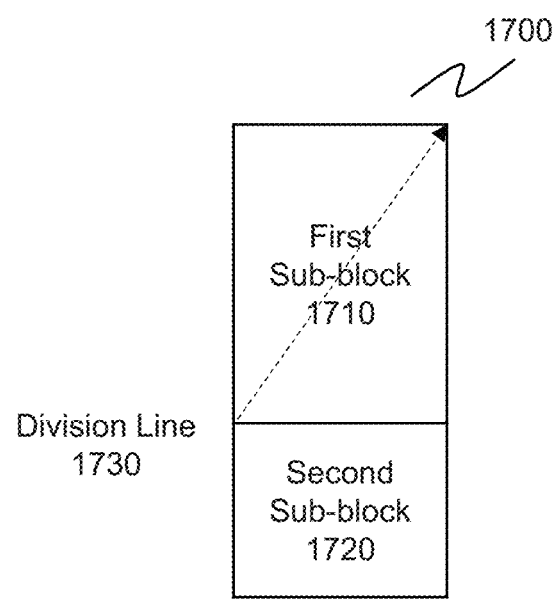
FIG. 17 is a schematic diagram illustrating an exemplary division line for dividing a coding block according to some embodiments of the present disclosure.

FIG. 17 is a schematic diagram illustrating an exemplary division line for dividing a coding block according to some embodiments of the present disclosure. As shown in FIG. 17, the coding block 1700 may include a size of 8×16. As described in connection with Table 1 in FIG. 6, conventional angular prediction modes for the coding block 1700 may be with sequence numbers within a range from 61 to 66 (denoted as M2), and corresponding wide angular prediction modes for the coding block 1700 may be with sequence numbers within a range from −4 to 1 (denoted as L2) when the width and height ratio of the coding block 1700 is equal to 0.5. Each of the conventional angular prediction modes M2 may correspond to a pixel offset value (e.g., the conventional angular prediction modes M2 may respectively correspond to pixel offset values of 18, 20, 23, 26, 29 and 32). The processing device 112 may determine a division point on a first side of the coding block 1700 according to Equation (3) or Equation (4):

$$V1=\text{floor}(32*\text{width}/\text{offset}), \quad (3)$$

$$V1=\text{ceil}(32*\text{width}/\text{offset}), \quad (4)$$

wherein V1 refers to a pixel value of the division point on the first side of the coding block 1700, floor refers to round down, ceil refers to round up, offset refers to a pixel offset value corresponding to one of the conventional angular prediction modes M2, and width refers to the width of the coding block 1700 (i.e., width in Equation (3) or Equation (4) for the coding block 1700 may be 8). The processing device 112 may determine a division line 1730 based on the division point such that the coding block 1700 may be divided into a first sub-block 1710 and a second sub-block 1720. The processing device 112 may predict the first sub-block 1710 using the conventional angular prediction modes M2. The processing device 112 may predict the second sub-block 1720 using the wide angular prediction modes L2 or angular prediction modes opposite to conventional angular prediction modes M2 (i.e., wide angular prediction modes L2+1).

In some embodiments, for a coding block with the width is greater than the height (e.g., the coding block 1600), the processing device 112 may determine the division point on the first side of the coding block 1600 according to Equation (5) or Equation (6):

$$V2=\text{floor}(32*\text{height}/\text{offset}), \quad (5)$$

$$V2=\text{ceil}(32*\text{height}/\text{offset}), \quad (6)$$

wherein V2 refers to a pixel value of the division point on the first side of the coding block 1600, floor refers to round down, ceil refers to round up, offset refers to a pixel offset value corresponding to one of the conventional angular prediction modes M1, and height refers to the height of the coding block 1600 (i.e., height in Equation (5) or Equation (6) for the coding block 1600 may be 8).

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by the present disclosure, and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer-readable media having computer-readable program code embodied thereon.

A computer-readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB.

NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system, comprising:
   at least one storage medium including a set of instructions; and
   at least one processor to communicate with the at least one storage medium, wherein when executing the set of instructions, the at least one processor is configured to direct the system to:
   obtain a coding block in an image;
   determine, based on the coding block, one or more searching templates corresponding to the coding block;
   for each of the one or more searching templates,
     determine, based on the searching template, one or more candidate blocks from a reference region, wherein the reference region includes a plurality of reference pixels that are encoded;
     determine a reference block corresponding to the searching template from the one or more candidate blocks; and
   designate a reference block from one or more reference blocks as a prediction block corresponding to the coding block, wherein to designate a reference block from one or more reference blocks as a prediction block corresponding to the coding block, the at least one processor is configured to direct the system to:
     determine one or more first candidate prediction blocks corresponding to the coding block using one or more prediction modes;
     designate the one or more reference blocks as one or more second candidate prediction blocks corresponding to the coding block; and
     determine the prediction block corresponding to the coding block based on the one or more first candidate prediction blocks and the one or more second candidate prediction blocks.

2. The system of claim 1, wherein one of the one or more searching templates includes at least one of the coding block or a block in the image that includes at least a portion of the plurality of reference pixels.

3. The system of claim 2, wherein the at least a portion of the plurality of reference pixels includes reference pixels distributed along at least one of two adjacent sides of the coding block.

4. The system of claim 1, wherein a size of each of the one or more candidate blocks is the same as a size of the searching template.

5. The system of claim 1, wherein to determine a reference block corresponding to the searching template from the one or more candidate blocks, the at least one processor is configured to direct the system to:
   determine one or more matching degrees each of which is between the searching template and one of the one or more candidate blocks; and
   determine, based on the one or more matching degrees, the reference block from the one or more candidate blocks.

6. The system of claim 5, wherein each of the one or more matching degrees is reflected by one of a value of a sum of absolute differences between pixels values in the searching template and pixel values in each of the one or more candidate blocks, a value of a mean squared error between pixels values in the searching template and pixel values in each of the one or more candidate blocks, a value of a mean absolute deviation between pixels values in the searching template and pixel values in each of the one or more candidate blocks, or a value of a count of threshold differences between pixels values in the searching template and pixel values in each of the one or more candidate blocks.

7. The system of claim 1, wherein to determine the prediction block corresponding to the coding block based on the one or more first candidate prediction blocks and the one or more second candidate prediction blocks, the at least one processor is configured to direct the system to:
   determine one or more first rate-distortion costs each of which corresponds to one of the one or more first candidate prediction blocks;
   determine one or more second rate-distortion costs each of which corresponds to one of the one or more second candidate prediction blocks; and
   determine the prediction block corresponding to the coding block based on the one or more first rate-distortion costs and the one or more second rate-distortion costs.

8. The system of claim 7, wherein to determine the prediction block corresponding to the coding block based on the one or more first rate-distortion costs and the one or more second rate-distortion costs, the at least one processor is configured to direct the system to:
   designate a specific second candidate prediction block among the one or more second candidate prediction blocks as the prediction block corresponding to the coding block in response to a determination that a second rate-distortion cost corresponding to the specific second candidate prediction block is minimum among the one or more second rate-distortion costs and the one or more first rate-distortion costs.

9. The system of claim 1, wherein the one or more prediction modes include at least one of a planar prediction mode, a DC prediction mode, or one or more angular prediction modes.

10. The system of claim 9, wherein the one or more angular prediction modes include at least one of one or more conventional angular prediction modes or one or more wide angular prediction modes.

11. The system of claim 10, wherein to determine one or more first candidate prediction blocks corresponding to the coding block using one or more prediction modes, the at least one processor is configured to direct the system to:
   determine that at least one of the one or more prediction modes is a wide angular prediction mode;
   divide the coding block into a first sub-block and a second sub-block;
   determine, based on the first sub-block, the second sub-block and the wide angular prediction mode, one of the one or more first candidate prediction blocks corresponding to the coding block.

12. The system of claim 11, wherein the coding block includes a first side and a second side that is less than the first side, and to divide the coding block into a first sub-block and a second sub-block, the at least one processor is configured to direct the system to:
   divide, based on a division line, the coding block into the first sub-block and the second sub-block, wherein the division line is parallel to the second side.

13. The system of claim 11, wherein to determine, based on the first sub-block, the second sub-block, and the wide angular prediction mode, one of the one or more first candidate prediction blocks corresponding to the coding block, the at least one processor is configured to direct the system to:
   determine a first prediction sub-block corresponding to the first sub-block using a conventional angular prediction mode corresponding to the wide angular prediction mode; and
   determine a second prediction sub-block corresponding to the second sub-block using the wide angular prediction mode or an angular prediction mode, wherein
      a prediction direction of the angular prediction mode is opposite to a prediction direction of the conventional angular prediction mode, and
      two sides of the first sub-block are adjacent to a first portion of the plurality of reference pixels, while only one side of the second sub-block is adjacent to a second portion of the plurality of reference pixels of the coding block.

14. The system of claim 11, wherein the reference region includes a plurality of pixels in a reference image that is encoded before the coding block.

15. A method implemented on a computing device including at least one processor and at least one storage medium, the method comprising:
   obtaining a coding block in an image;
   determining, based on the coding block, one or more searching templates corresponding to the coding block;
   for each of the one or more searching templates,
      determining, based on the searching template, one or more candidate blocks from a reference region, wherein the reference region includes a plurality of reference pixels that are encoded;
      determining a reference block corresponding to the searching template from the one or more candidate blocks; and
   designating a reference block from one or more reference blocks as a prediction block corresponding to the coding block by:
      determining one or more first candidate prediction blocks corresponding to the coding block using one or more prediction modes;
      designating the one or more reference blocks as one or more second candidate prediction blocks corresponding to the coding block; and
      determining the prediction block corresponding to the coding block based on the one or more first candidate prediction blocks and the one or more second candidate prediction blocks.

16. The method of claim 15, wherein one of the one or more searching templates includes at least one of the coding block or a block in the image that includes at least a portion of the plurality of reference pixels.

17. The method of claim 16, wherein the at least a portion of the plurality of reference pixels includes reference pixels distributed along at least one of two adjacent sides of the coding block.

18. The method of claim 15, wherein a size of each of the one or more candidate blocks is the same as a size of the searching template.

19. A non-transitory computer readable medium, comprising executable instructions that, when executed by at least one processor, direct the at least one processor to perform a method, the method comprising:
   obtaining a coding block in an image;
   determining, based on the coding block, one or more searching templates corresponding to the coding block;
   for each of the one or more searching templates,
      determining, based on the searching template, one or more candidate blocks from a reference region, wherein the reference region includes a plurality of reference pixels that are encoded;
      determining a reference block corresponding to the searching template from the one or more candidate blocks; and
   designating a reference block from one or more reference blocks as a prediction block corresponding to the coding block by;
      determining one or more first candidate prediction blocks corresponding to the coding block using one or more prediction modes;
      designating the one or more reference blocks as one or more second candidate prediction blocks corresponding to the coding block; and
      determining the prediction block corresponding to the coding block based on the one or more first candidate prediction blocks and the one or more second candidate prediction blocks.

* * * * *